US011766773B2

(12) United States Patent
Tadokoro et al.

(10) Patent No.: US 11,766,773 B2
(45) Date of Patent: Sep. 26, 2023

(54) POWER TOOL

(71) Applicant: KOKI HOLDINGS CO., LTD., Tokyo (JP)

(72) Inventors: Naoki Tadokoro, Hitachinaka (JP); Ken Inui, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 589 days.

(21) Appl. No.: 16/958,025

(22) PCT Filed: Nov. 30, 2018

(86) PCT No.: PCT/JP2018/044197
§ 371 (c)(1),
(2) Date: Jun. 25, 2020

(87) PCT Pub. No.: WO2019/130979
PCT Pub. Date: Jul. 4, 2019

(65) Prior Publication Data
US 2021/0060754 A1 Mar. 4, 2021

(30) Foreign Application Priority Data

Dec. 25, 2017 (JP) ................................ 2017-248335
Oct. 31, 2018 (JP) ................................ 2018-206112

(51) Int. Cl.
*B25F 5/00* (2006.01)
*B25F 5/02* (2006.01)
(Continued)

(52) U.S. Cl.
CPC ................ *B25F 5/008* (2013.01); *B25F 5/02* (2013.01); *H02K 7/145* (2013.01); *H02K 9/06* (2013.01);
(Continued)

(58) Field of Classification Search
CPC ............ B25F 5/008; B25F 5/02; H02K 7/145; H02K 9/06; H02K 11/33; B25D 2217/0061; B25D 2250/121; B23D 51/00
See application file for complete search history.

(56) References Cited

U.S. PATENT DOCUMENTS

| 2003/0163924 A1 | 9/2003 | Hempe et al. |
| 2004/0124721 A1 | 7/2004 | Pfisterer et al. |

(Continued)

FOREIGN PATENT DOCUMENTS

| CN | 1487650 A | 4/2004 |
| CN | 1507378 A | 6/2004 |

(Continued)

OTHER PUBLICATIONS

Machine translation for IDS provided reference JP2016193477A (Year: 2016).*

(Continued)

*Primary Examiner* — Ahmed Elnakib
(74) *Attorney, Agent, or Firm* — NovoTechIP International PLLC

(57) ABSTRACT

There is provided a power tool including a housing, a brushless motor, a power supply circuit, and a fan. The housing is formed with an inlet hole and an exhaust hole. The brushless motor is supported by the housing. The power supply circuit includes at least one circuit element for supplying electric power of a power source to the brushless motor. The fan is driven by rotation of the brushless motor to generate a cooling air flow that flows from the inlet hole to the exhaust hole in the housing. The housing includes a first housing including a grip portion and supporting the brushless motor. The inlet hole is formed in the first housing. The at least one circuit element is disposed inside the first housing and is cooled by the cooling air flow.

20 Claims, 17 Drawing Sheets

(51) Int. Cl.
*H02K 7/14* (2006.01)
*H02K 9/06* (2006.01)
(52) U.S. Cl.
CPC ............... *B25D 2217/0061* (2013.01); *B25D 2250/121* (2013.01)

(56) References Cited

U.S. PATENT DOCUMENTS

| | | | |
|---|---|---|---|
| 2005/0022395 | A1 | 2/2005 | Hirabayashi |
| 2007/0237591 | A1 | 10/2007 | Ohlendorf |
| 2011/0171887 | A1 | 7/2011 | Tanimoto et al. |
| 2013/0227845 | A1 | 9/2013 | Fujiwara |
| 2014/0048301 | A1 | 2/2014 | Okouchi et al. |
| 2014/0190023 | A1 | 7/2014 | Vitantonio et al. |
| 2015/0263592 | A1 | 9/2015 | Kawakami et al. |
| 2015/0336232 | A1 | 11/2015 | Bergquist et al. |
| 2016/0250743 | A1 | 9/2016 | Kikuchi et al. |
| 2016/0294254 | A1 | 10/2016 | Hara et al. |
| 2017/0136614 | A1 | 5/2017 | Takeda |
| 2017/0239804 | A1* | 8/2017 | Matsushita ............ H02K 11/33 |

FOREIGN PATENT DOCUMENTS

| | | | |
|---|---|---|---|
| CN | 1579692 | A | 2/2005 |
| CN | 105722647 | A | 6/2016 |
| CN | 106470804 | A | 3/2017 |
| EP | 2103396 | A1 | 9/2009 |
| JP | 2010173042 | A | 8/2010 |
| JP | 2013/180382 | A | 9/2013 |
| JP | 2014097570 | A | 5/2014 |
| JP | 2015-100887 | A | 6/2015 |
| JP | 2016-93848 | A | 5/2016 |
| JP | 2016-193477 | A | 11/2016 |
| JP | 2016193477 | A * | 11/2016 ............ B23D 49/16 |
| JP | 2016193478 | A | 11/2016 |
| JP | 2017148936 | A | 8/2017 |
| JP | 2017159434 | A | 9/2017 |
| WO | 2016/067810 | A1 | 5/2016 |

OTHER PUBLICATIONS

Supplementary European Search Report dated Oct. 8, 2020 in corresponding PCT/JP2018/044197 (English Translation).
International Preliminary Report on Patentability dated Jun. 30, 2020 in corresponding PCT/JP2018/044197 (English Translation).
International Search Report and Written Opinion dated Feb. 19, 2019 by the International Searching Authority (Japan Patent Office) in PCT Application PCT/JP2018/044197 (English Translation of the ISR).
Office Action dated Sep. 6, 2022 in corresponding Chinese patent application No. 201880084176.6.
"Office Action Issued in Japanese Patent Application No. 2019-562887", dated Nov. 17, 2020, 12 Pages.
Office Action dated Apr. 18, 2023 in corresponding Japanese patent application No. 2021-113176.

\* cited by examiner

POWER TOOL

TECHNICAL FIELD

The present invention relates to a power tool.

BACKGROUND ART

Conventionally, there has been known a power tool employing an electric motor as a drive source. For example, Patent Literature 1 discloses a power tool including a motor with brush, a plunger to which a blade for cutting a workpiece is attachable, and a motion converting portion for converting rotation of the motor into reciprocal movement of the plunger. The workpiece can be cut by the reciprocal movement of the blade attached to the plunger.

On the other hand, in recent years, a prolonged life and maintenance-free of the power tool has been desired and various proposals have been made for achieving the prolonged life and maintenance-free of the power tool.

CITATION LIST

Patent Literature

[PTL1] Japanese Patent Application Publication No. 2013-180382

SUMMARY OF INVENTION

Technical Problem

It is conceivable to employ a brushless motor in place of the motor with brush in order to achieve the prolonged life and maintenance free of the power tool. However, in the power tool employing the motor with brush (for example, the power tool disclosed in Patent Literature 1), such employment of a brushless motor instead of the motor with brush requires provision of circuit elements such as switching elements and a rectifier element for driving the brushless motor, and these circuit elements generate heat due to supply of power to the brushless motor. Therefore, if a brushless motor is employed in such power tool, it is necessary to effectively cool the circuit elements generating heat due to supply of power. Further, in a high-power electric power tool, the circuit elements tend to become large in size in order to cope with large current. Hence, the power tool may become large in size because of the accommodation of the circuit elements.

In view of the foregoing, it is an object of the present invention to provide a power tool in which a prolonged life and maintenance-free can be achieved by employing a brushless motor and effective cooling to circuit elements generating heat due to supply of power to the brushless motor can be attained.

Further, another object of the present invention is to provide a power tool in which an increase in size due to mounting of circuit elements can be suppressed.

Solution to Problem

In order to attain the object, the present invention provides a power tool including a housing, a brushless motor, a power supply circuit, and a fan. The housing is formed with an inlet hole and an exhaust hole. The brushless motor is supported by the housing. The power supply circuit includes at least one circuit element for supplying electric power of a power source to the brushless motor. The fan is driven by rotation of the brushless motor to generate a cooling air flow that flows from the inlet hole to the exhaust hole in the housing. The housing includes a first housing including a grip portion and supporting the brushless motor. The inlet hole is formed in the first housing. The at least one circuit element is disposed inside the first housing and is cooled by the cooling air flow.

With this structure, the inlet hole is formed in the first housing, and the circuit element generating heat upon supply of electric power to the brushless motor is disposed inside the first housing. Therefore, the circuit element can be cooled by the cooling air flow whose temperature is low. Accordingly, a prolonged life and maintenance-free are achieved by employing the brushless motor, and the circuit element generating heat upon supply of electric power to the brushless motor can be effectively cooled.

Further, in the above-described structure, it is preferable that: the power tool further includes a reciprocal movement portion reciprocally movably supported by the housing, and a motion converting portion configured to convert the rotation of the brushless motor into reciprocal motion of the reciprocal movement portion; the housing further includes a second housing accommodating therein the motion converting portion; the reciprocal movement portion is supported by the second housing so as to be reciprocally movable along an axis extending in a first direction; the first housing further includes a motor support portion supporting the brushless motor, and a connecting portion connecting the grip portion and the motor support portion; the grip portion extends in a second direction crossing the first direction, and is positioned at an opposite side of the motor support portion from the reciprocal movement portion in the first direction; the inlet hole is formed in the motor support portion; and the at least one circuit element is disposed inside the motor support portion.

With this structure, the inlet hole is formed in the motor support portion, and the circuit element generating heat upon supply of electrical power to the brushless motor is disposed inside the motor support portion. Therefore, the circuit element can be cooled with the cooling air whose temperature is low. As a result, effective cooling to the circuit element can be performed.

Further, in the above-described structure, it is preferable that: the power tool further includes a power supply cord extending from the housing and connectable to the power source; the power supply circuit further includes a filter element for reducing noise transmitted from the power source to the power supply circuit; and the filter element is disposed inside one of the connecting portion and the grip portion.

With this structure, the filter element having a low priority for cooling is disposed inside the connecting portion, not inside the motor support portion. Therefore, the circuit element generating heat upon supply of electrical power to the brushless motor can be cooled on a priority basis. As a result, effective cooling to the circuit element generating heat upon supply of electrical power to the brushless motor can be further promoted.

Further, in the above-described structure, it is preferable that: the power supply circuit includes an inverter circuit for driving the brushless motor; and the at least one circuit element includes a plurality of switching elements constituting the inverter circuit.

With this structure, the switching element having a high priority for cooling can be effectively cooled.

Further, in the above-described structure, it is preferable that: the power tool further includes a controller configured to control the plurality of switching elements to drive the brushless motor, and a control board on which the controller is mounted; and at least part of the control board is positioned inside the connecting portion.

With this structure, a portion of the control board on which the controller having a low priority for cooling is mounted, is disposed in the connecting portion through which the cooling air flow does not pass. As a result, further enhanced cooling efficiency for the circuit element having a high priority for cooling can be obtained.

Further, in the above-described structure, it is preferable that: the power supply circuit further includes a capacitor for smoothening a voltage of the power source; and at least part of the capacitor is disposed inside the connecting portion.

With this structure, the circuit element generating heat upon supply of electrical power to the brushless motor can be cooled on a priority basis to further enhance cooling efficiency, since a portion of the capacitor having a low priority for cooling is disposed inside the connecting portion where the cooling air flow does not pass. Further, the first housing can be reduced in size since the internal space of the connecting portion which is a dead space can be effectively utilized.

Further, in the above-described structure, it is preferable that: the connecting portion includes a first connecting portion connecting one end portion of the grip portion in the second direction and the motor support portion, and a second connecting portion connecting another end portion of the grip portion in the second direction and the motor support portion; and the filter element is accommodated in one of the first connecting portion and the second connecting portion, and the at least part of the capacitor is accommodated in remaining one of the first connecting portion and the second connecting portion.

With this structure, the first housing can further be compact since the internal spaces of the first and second connecting portions can be effectively utilized.

Further, in the above-described structure, it is preferable that: the housing further includes a motor case integrally molded; the motor case is supported by the motor support portion; and the brushless motor is accommodated in the motor case.

With this structure, the motor case can rigidly support the brushless motor since the motor case is integrally molded. Further, the brushless motor can be supported at a high accuracy while deformation and breakage of the motor case can be suppressed.

Further, in the above-described structure, it is preferable that: a communication hole allowing an interior of the motor support portion to be communicated with an interior of the motor case is formed in one end portion of the motor case in the first direction, the one end portion of the motor case in the first direction being closer to the grip portion than another end portion of the motor case in the first direction is to the grip portion; and the cooling air flow flows into the interior of the motor case through the communication hole after cooling the at least one circuit element.

With this structure, the cooling target positioned in the motor case can be cooled.

Further, in the above-described structure, it is preferable that: the power tool further includes a wiring extending from the power supply circuit to the interior of the motor case through the communication hole.

This structure enables the wiring to extend to the interior of the motor case without separately forming an additional hole which allows the wiring to pass therethrough for the wiring to extend to the interior of the motor case. Hence, the process of forming the additional hole can be omitted.

Further, in the above-described structure, it is preferable that; the power supply circuit includes an inverter circuit for driving the brushless motor; the at least one circuit element includes a plurality of switching elements constituting the inverter circuit; the plurality of switching elements includes a first switching element and a second switching element which are arrayed in a third direction perpendicular to a perpendicular direction perpendicular to both the first direction and the second direction; the motor support portion is formed with a second inlet hole; the inlet hole and the second inlet hole are arrayed in the third direction; the first switching element has a part overlapping with the inlet hole as viewed in the perpendicular direction; and the second switching element has a part overlapping with the inlet hole as viewed in the perpendicular direction.

With this structure, the cooling air flow that flows from the first inlet hole to the exhaust hole cools the first switching element in a state where the cooling air flow has its lowest temperature, and the cooling air flow that flows the second inlet hole to the exhaust hole cools the second switching element in a state where the cooling air flow has its lowest temperature. Therefore, the first and second switching elements can be further effectively cooled.

Further, in the above-described structure, it is preferable that: the power tool further includes a board on which the at least one circuit element is mounted, and a board case accommodating therein the board; the brushless motor includes a rotation shaft portion extending in a first direction; the housing further includes a motor case integrally molded in a hollow cylindrical shape extending in the first direction; the first housing includes a motor case support portion supporting the motor case, and a connecting portion connecting the grip portion and the motor case support portion; the brushless motor is supported by the motor case; the board case is disposed inside the motor case support portion; and one of at least part of the at least one circuit element and at least part of the board case overlaps with the motor case in the first direction.

With this structure, the board case can be disposed more closer to the motor case. Consequently, reduction in size of the first housing in the first direction, and hence, reduction in size of the power tool in the first direction can be attained.

Further, in the above-described structure, it is preferable that: the power tool further includes a board on which the at least one circuit element is mounted, and a board case accommodating therein the board; the brushless motor includes a rotation shaft portion extending in a first direction; the housing further includes a motor case integrally molded in a hollow cylindrical shape extending in the first direction, the motor case supporting the brushless motor; the first housing is formed by assembling two divided housing halves together in a direction perpendicular to the first direction; the board case is nipped and supported by the two divided housing halves; the motor case is formed with a communication hole allowing an interior of the first housing to be communicated with an interior of the motor case; and at least part of the inlet hole is positioned between the board case and the communication hole in the first direction.

With this structure, at least part of the air inlet hole is positioned between the board case and the communication hole in the first direction. Hence, the cooling air flow can more smoothly flow in comparison with a structure where the inlet hole has no part positioned between the board case and the communication hole in the first direction. Hence, cooling efficiency can be improved.

Further, in the above-described structure, it is preferable that: the board case has a box shape opening toward the motor case; and the communication hole is formed in one end portion of the motor case in the first direction, the one end portion of the motor case in the first direction being closer to the grip portion than another end portion of the motor case in the first direction is to the grip portion.

With this structure, the open end side of the board case can be properly cooled.

Further, in the above-described structure, it is preferable that: the power tool further includes a board on which the at least one circuit element is mounted, and a board case accommodating therein the board; the brushless motor comprises a rotation shaft portion extending in a first direction; the board case extends in a direction substantially perpendicular to the first direction; and a center of the board case is positioned offset from a center of the rotation shaft portion.

With this structure, the layout of the components protruding from the board case can be facilitated. Further, in a structure where the inlet hole are formed at each of the upper portion of the housing which portion is above the center of the board case and the lower portion of the housing which portion is below the center of the board case, the layout can be easily achieved in which the cooling air flow introduced through one of the upper inlet hole and the lower inlet hole can be prevented from being blocked.

Advantageous Effects of Invention

According to the present invention, there can be provided a power tool in which a prolonged life and maintenance-free are achieved by employing a brushless motor, and a circuit element which generate heat due to supply of power to the brushless motor can be efficiently cooled.

DESCRIPTION OF EMBODIMENTS

Figure 1:
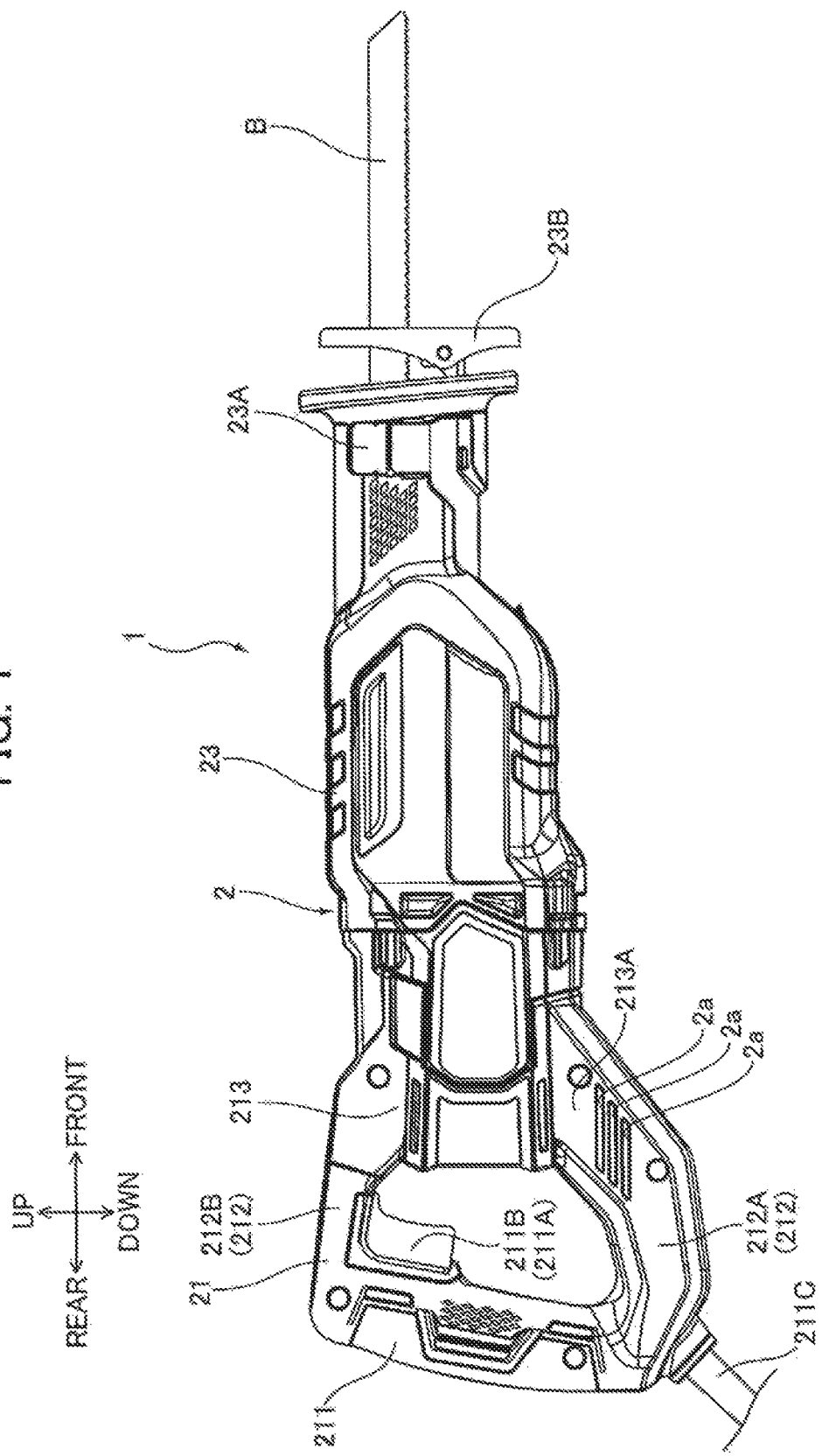
FIG. 1 is a side view illustrating an external appearance of a saber saw according to a first embodiment of the present invention.

Hereinafter, power tools according to several embodiments of the present invention will be described with reference to FIGS. 1 through 17. In the following description, "up", "down", "front", "rear", "right", and "left" indicated by arrows depicted in the drawings define the upward direction, downward direction, frontward direction, rearward direction, rightward direction, and leftward direction, respectively.

First, a saber saw 1 as an example of a power tool according to a first embodiment of the present invention will be described with reference to FIGS. 1 through 8.

Figure 2:
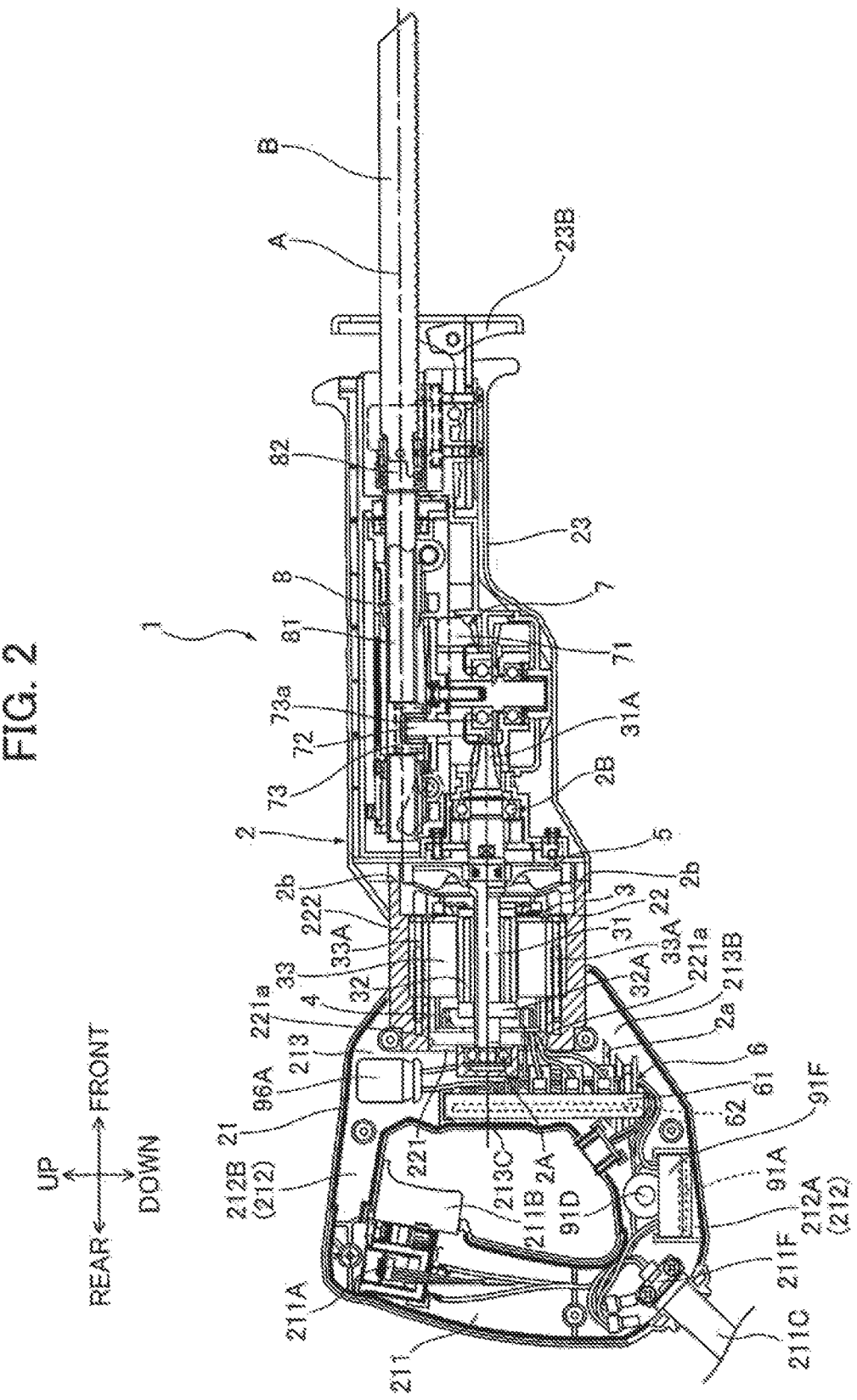
FIG. 2 is a cross-sectional view illustrating an internal structure of the saber saw according to the first embodiment of the present invention.
Figure 5:
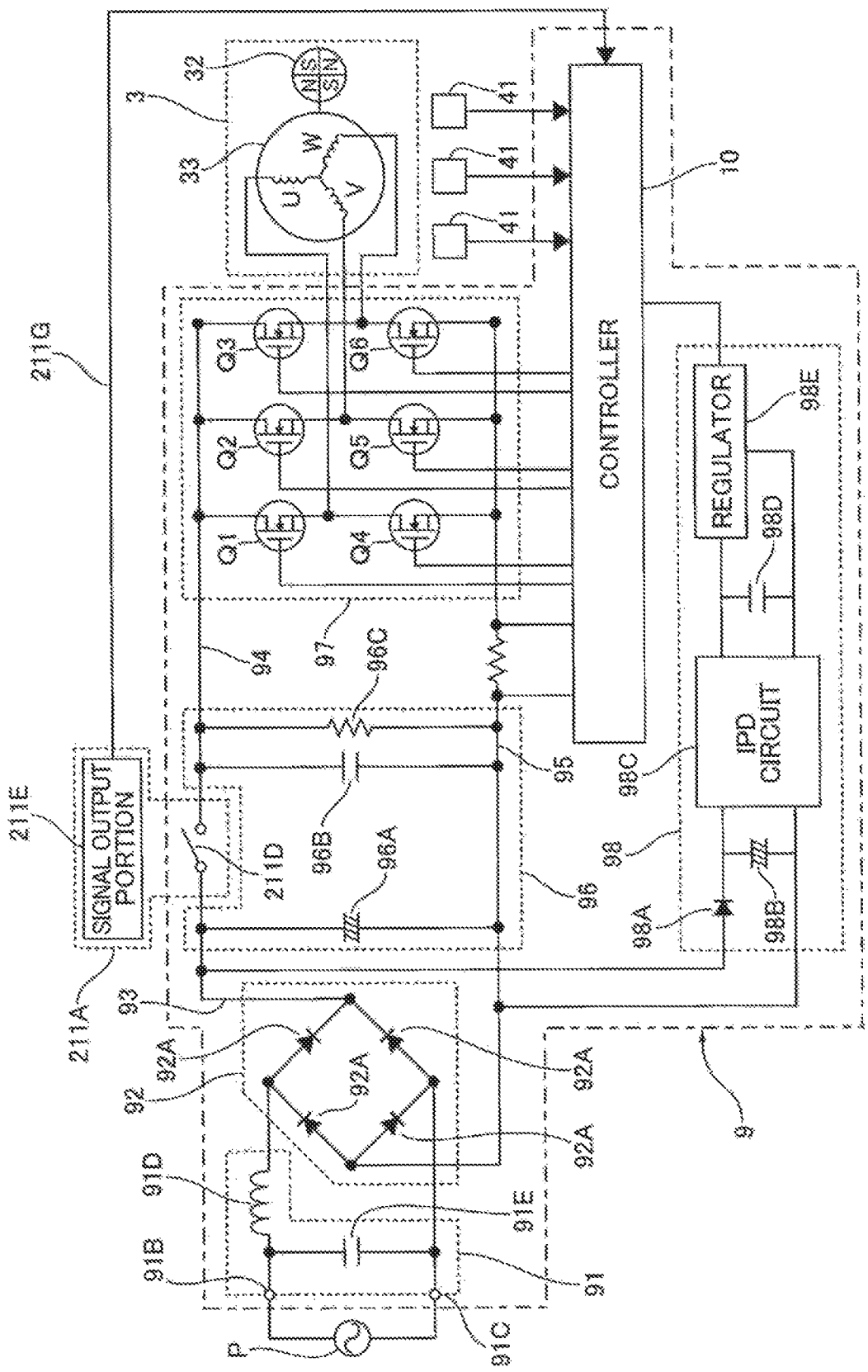
FIG. 5 is a circuit diagram illustrating an electrical configuration in the saber saw according to the first embodiment of the present invention.

The saber saw 1 illustrated in FIG. 1 is an electrically powered reciprocating tool for cutting a workpiece such as a wood, a steel, and a pipe. As illustrated in FIGS. 1 and 2, the saber saw 1 includes a housing 2, a brushless motor 3 having a rotation shaft 31, a sensor board 4, a fan 5, a board portion 6, a motion converting portion 7, a reciprocal movement portion 8 to which a blade B for cutting the workpiece is attachable, a power supply circuit 9 (FIG. 5), and a controller 10 (FIG. 5). In the saber saw 1, the brushless motor 3 is employed as a drive source, rotation of the brushless motor 3 causes reciprocal movement of the reciprocal movement portion 8 having the blade B attached thereto, and this reciprocal movement of the blade B enables cutting work.

As illustrated in FIGS. 1 and 2, the housing 2 constitutes an outer shell of the saber saw 1, and includes a handle housing 21, a motor case 22, and a gear case 23. The housing 2 is formed with a plurality of inlet holes 2*a* and a plurality of exhaust holes 2*b* (in the present embodiment, six inlet holes 2*a* and two exhaust holes 2*b* are formed).

Figure 7:
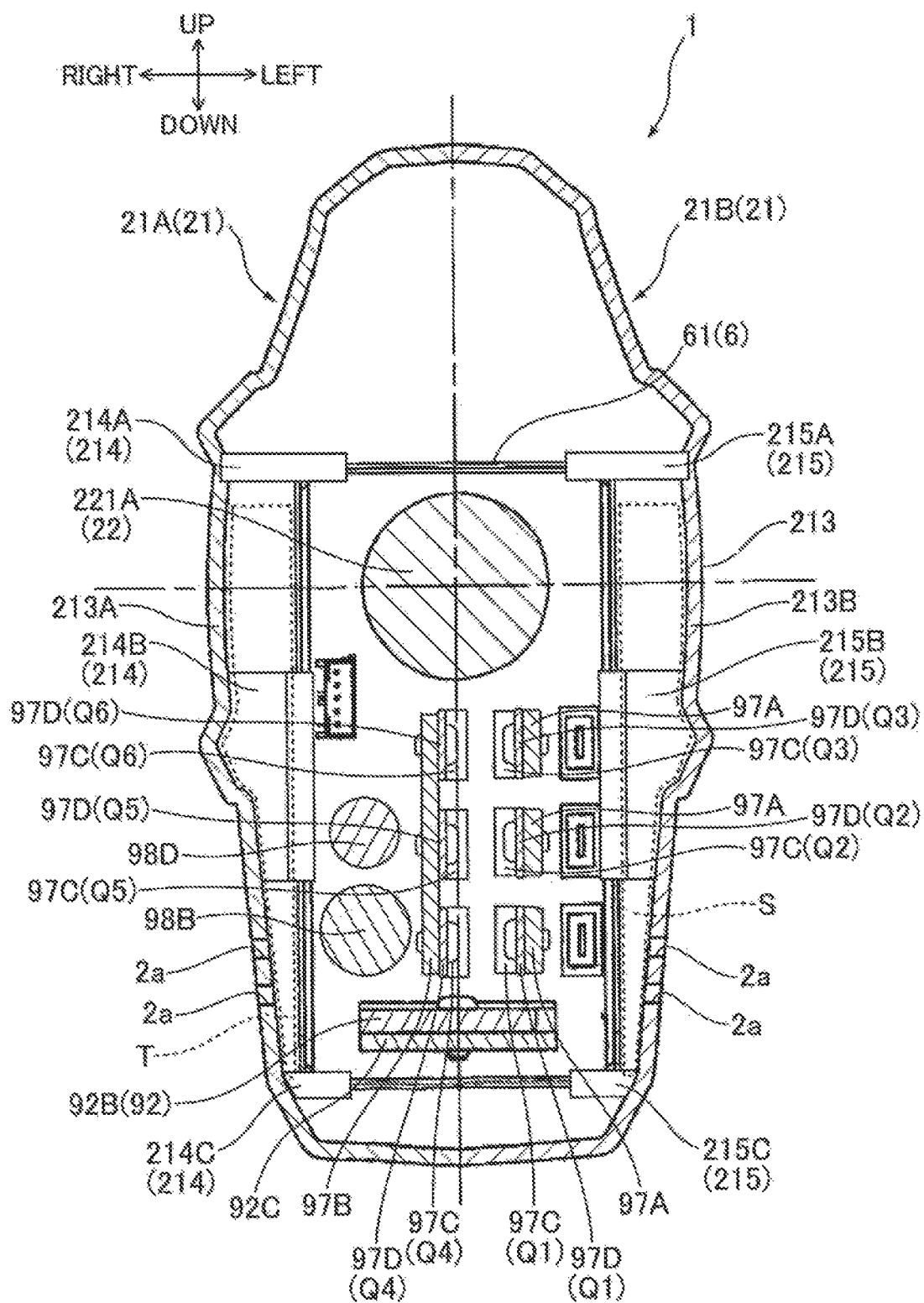
FIG. 7 is a cross-sectional view taken along the line VII-VII in FIG. 6 and illustrating a board accommodating portion in the saber saw according to the first embodiment of the present invention.

The handle housing 21 is made of resin, and constitutes a rear portion of the housing 2. The handle housing 21 is connected to a rear portion of the motor case 22. The handle housing 21 supports the motor case 22 and covers a part of the motor case 22. The handle housing 21 is a two-divided housing formed by assembling together two divided housing halves in the leftward/rightward direction. Specifically, as illustrated in FIG. 7, the handle housing 21 is formed by assembling together a right divided housing half 21A and a left divided housing half 21B which are substantially symmetrical with each other with respect to an imaginary plane extending in a direction perpendicular to the leftward/ rightward direction and passing through the center in the leftward/rightward direction of the handle housing 21. Hence, the handle housing 21 is substantially bilaterally symmetrical in shape. The handle housing 21 is an example of a "first housing" in the present invention. The right divided housing half 21A and the left divided housing half 21B are an example of "two divided housing halves" in the present invention.

As illustrated in FIGS. 1, 2 and 7, the handle housing 21 includes a grip portion 211, a connecting portion 212, a motor support portion 213, a right rib portion 214, and a left rib portion 215.

Figure 3:
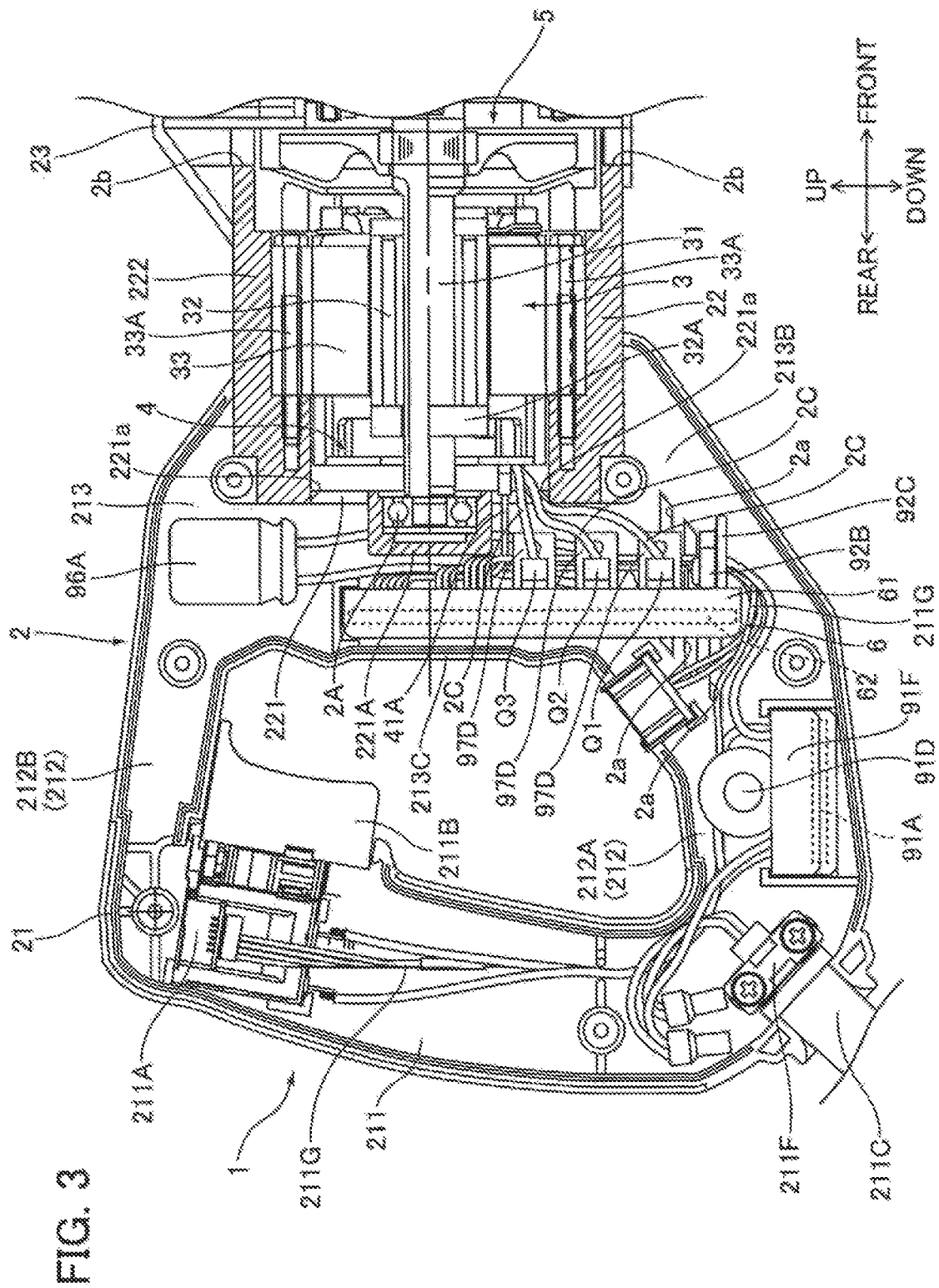
FIG. 3 is a partial enlarged cross-sectional view illustrating an internal structure of a handle housing and a motor case in the saber saw according to the first embodiment of the present invention.

The grip portion 211 is configured to be gripped by an operator, and has a generally hollow cylindrical shape extending in the upward/downward direction as illustrated in FIG. 2. A switch mechanism portion 211A is accommodated in an upper portion of the internal space of the grip portion 211. A trigger 211B configured to be manually operable is positioned frontward of the switch mechanism portion 211A. Further, as illustrated in FIG. 3, a signal wire 211G extends from the switch mechanism portion 211A, and a power source cord 211C extends from a lower end portion of the grip portion 211. The upward/downward direction is an example of "second direction" in the present invention.

The switch mechanism portion 211A includes a switch 211D and a signal output portion 211E as illustrated in FIG. 5. The switch 211D is configured to be switched between a closed state (an ON state) and an open state (an OFF state) in interlocking relation to operations to the trigger 211B. The switch 211D constitutes a part of the power supply circuit 9, and is connected on a power supply line for the brushless motor 3 in the power supply circuit 9. Specifically, the switch 211D is placed into the closed state (the ON state) in response to a pulling operation to the trigger 211B (i.e., in response to pushing the trigger 211E rearward), enabling power supply to the brushless motor 3. On the other hand, the switch 211D is placed into the open state (the OFF state) in response to the release of the pulling operation to the trigger 211B, disabling power supply to the brushless motor 3.

The signal output portion 211E is connected to the controller 10, and is configured to output a start signal to the controller 10 upon detection of a pulling operation to the trigger 211B. Specifically, the signal output portion 211E continues outputting the start signal to the controller 10 while the pulling operation to the trigger 211B is being performed, and terminates the output of the start signal upon the release of the pulling operation.

The signal wire 211G is a wire electrically connecting the signal output portion 211E to the controller 10. The signal wire 211G extends, through an interior of the grip portion 211 and an interior of a first connecting portion 212A, from the switch mechanism portion 211A to the controller 10 mounted on a circuit board 62 of the board portion 6. The start signal outputted from the signal output portion 211E is inputted to the controller 10 through the signal wire 211G.

Turning back to FIG. 1, the power source cord 211C includes a connection plug (not illustrated) connectable to an external power source P, and hence is connectable to the external power source P (FIG. 5). In the present embodiment, the external power source P is a commercial AC power source. Note that, the external power source P is not limited to the commercial AC power source as long as the external power source P is a power source outputting AC voltage. For example, the external power source P may be a generator configured to generate AC voltage.

As illustrated in FIGS. 1 and 2, the connecting portion 212 includes the first connecting portion 212A and a second connecting portion 212B, and connects the grip portion 211 to the motor support portion 213. The first connecting portion 212A has a generally hollow cylindrical shape extending frontward from the front lower end portion of the grip portion 211. The first connecting portion 212A connects the front lower end portion of the grip portion 211 and the rear lower end portion of the motor support portion 213. The first connecting portion 212A defines therein an internal space in which a choke coil 91D (described later) and other components which constitute the power supply circuit 9 are accommodated. The second connecting portion 212B has a generally hollow cylindrical shape extending frontward from the front upper end portion of the grip portion 211. The second connecting portion 212B connects the front upper end portion of the grip portion 211 and the rear upper end portion of the motor support portion 213. The lower end portion of the grip portion 211 is an example of "one end portion" in the present invention. Further, the upper end portion of the grip portion 211 is an example of "another end portion" in the present invention.

The motor support portion 213 is positioned frontward of the grip portion 211, and is connected to a rear portion of the motor case 22, and supports the motor case 22. The motor support portion 213 defines therein an internal space in which the board portion 6 and other components are accommodated. The motor support portion 213 is an example of a "motor case support portion".

As illustrated in FIG. 1, the motor support portion 213 includes a right side wall 213A, and three inlet holes 2a are formed in the lower portion of the right side wall 213A and arrayed in the upward/downward direction. Each of the three inlet holes 2a extends in the frontward/rearward direction and penetrates the right side wall 213A in the leftward/ rightward direction. The interior of the motor support portion 213 and an outside of the housing 2 are communicated with each other through the three inlet holes 2a. Further, as illustrated in FIG. 2, the motor support portion 213A includes a left side wall 213B, and three inlet holes 2a are formed also in the lower portion of the left side wall 213B in the same configuration as the right side wall 213A. As described above, since the handle housing 21 is substantially bilaterally symmetrical in shape, the shapes and layout of the three inlet holes 2a formed in the left side wall 213B are symmetrical with those of the three inlet holes 2a formed in the right side wall 213A with respect to the above-described imaginary plane. Accordingly, description to the shapes and layout of the three inlet holes 2a formed in the left side wall 213B is omitted.

As illustrated in FIG. 7, the right rib portion 214 and the left rib portion 215 nip a board accommodating portion 61 (described later) therebetween in the leftward/rightward direction to support the board accommodating portion 61 inside the housing 2. The right rib portion 214 includes a first right rib 214A, a second right rib 214B, and a third right rib 214C, and the left rib portion 215 includes a first left rib 215A, a second left rib 215B, and a third left rib 215C which protrude rightward from the left side wall 213B.

The first right rib 214A protrudes leftward from the right side wall 213A, and is engaged with the upper end portion of the right edge of the board accommodating portion 61. The second right rib 214B protrudes leftward from the right side wall 213A, and is engaged with substantially the center portion in the upward/downward direction of the right edge of the board accommodating portion 61. The third right rib 214C protrudes leftward from the right side wall 213A, and is engaged with the lower end portion of the right edge of the board accommodating portion 61.

The first left rib 215A protrudes rightward from the left side wall 213B, and is engaged with the upper end portion of the left edge of the board accommodating portion 61. The second left rib 215B protrudes rightward from the left side wall 213B, and is engaged with substantially the center portion in the upward/downward direction of the left edge of the board accommodating portion 61. The third left rib 215C protrudes rightward from the left side wall 213B, and is engaged with the lower end portion of the left edge of the board accommodating portion 61.

The position in the upward/downward direction of the board accommodating portion 61 and the position in the frontward/rearward direction of the board accommodating portion 61 are fixed by four ribs, namely, the first right rib 214A, the third right rib 214C, the first left rib 215A, and the third left rib 215C. Further, the board accommodating portion 61 is nipped by the second right rib 214B and the second left rib 215B therebetween, and the position in the leftward/rightward direction of the board accommodating portion 61 is fixed by the second right rib 214B and the second left rib 215B.

The motor case 22 is an integrally molded member made of resin. The motor case 22 has a hollow cylindrical shape extending in the frontward/rearward direction. Specifically, as illustrated in FIGS. 2 and 3, the motor case 22 has a bottomed hollow cylindrical shape extending in the frontward/rearward direction and opening frontward. The motor case 22 includes a rear wall portion 221 and a sleeve portion 222, and accommodates therein the brushless motor 3, the sensor board 4, and the fan 5.

As illustrated in FIG. 3, the rear wall portion 221 constitutes the rear portion of the motor case 22, and has a generally circular shape in rear view. The rear wall portion 221 includes a bearing support portion 221A. The bearing support portion 221A protrudes rearward from substantially the center portion of the rear surface of the rear wall portion 221, and has a generally hollow cylindrical shape with its rear end being closed. The bearing support portion 221A supports therein a ball bearing 2A.

The rear wall portion 221 is formed with a plurality of communication holes 221a penetrating the rear wall portion 221 in the frontward/rearward direction. The communication holes 221a communicate the interior of the motor case 22 with the interior of the motor support portion 213 (the interior of the handle housing 21). The communication holes 221a are formed arrayed in the circumferential direction of the bearing support portion 221A with predetermined intervals at positions outward of the bearing support portion 221A in the radial direction thereof.

The sleeve portion 222 has a generally hollow cylindrical shape extending frontward from the peripheral portion of the rear wall portion 221. The front open end of the sleeve portion 222 is closed by the gear case 23. The front end portion of the sleeve portion 222 is formed with the two exhaust holes 2b.

One of the two exhaust holes 2b is formed in the upper portion of the front end portion of the sleeve portion 222, and the remaining one of the two exhaust holes 2b is formed in the lower portion of the front end portion of the sleeve portion 222. Each exhaust hole 2b penetrates the sleeve portion 222 in the upward/downward to allow the interior of the motor case 22 to be communicated with the outside of the housing 2. Each exhaust hole 2b is formed by cutting away a part of the front end portion of the sleeve portion 222, and the front open ends of the exhaust holes 2b are closed by the gear case 23.

As illustrated in FIGS. 1 and 2, the gear case 23 has a generally hollow cylindrical shape extending in the frontward/rearward direction, and is connected to the front portion of the motor case 22. The gear case 23 is made of metal, and accommodates therein the motion converting portion 7 and the reciprocal movement portion 8, and supports a ball bearing 2B. Further, as illustrated in FIG. 1, a lever 23A is provided at the right front portion of the gear case 23. The lever 23A is manually operable for attaching and detaching the blade B to and from the reciprocal movement portion 8. Further, a base 23B is provided at the front end of the gear case 23. The base 23B is configured to be abutted on the workpiece during cutting work. The gear case 23 is an example of a "second housing" in the present invention.

As illustrated in FIGS. 2 and 3, the brushless motor 3 is accommodated in the motor case 22, and includes the rotation shaft 31, a rotor 32, and a stator 33. The brushless motor 3 is a three-phase brushless DC motor, and functions as a drive source of the saber saw 1, i.e., as a drive source for driving the reciprocal movement portion 8. In the present embodiment, the rated output of the brushless motor 3 is about 1500 W, for example.

As illustrated in FIG. 2, the rotation shaft 31 extends in the frontward/rearward direction, and is rotatably supported by the motor case 22 and the gear case 22 through the ball bearings 2A and 2B. A pinion 31A is provided at the front end of the rotation shaft 31. The pinion 31A is configured to rotate integrally with the rotation shaft 31. The rotation shaft is an example of a "rotation shaft portion" in the present invention.

The rotor 32 includes a permanent magnet, and is coaxially fixed to the rotation shaft 31 so as to rotate coaxially and integrally with the rotation shaft 31. A sensor magnet 32A is provided at the rear end of the rotor 32 so as to rotate integrally with the rotor 32.

The stator 33 has a generally hollow cylindrical shape extending in the frontward/rearward direction, and includes three stator coils U, V, W (FIG. 5) connected to each other in the form of star connection. Each of the upper and lower portions of the outer peripheral portion of the stator 33 is fixed to the motor case 22 by a bolt 33A. Hence, the brushless motor 3 is fixed to the motor case 22 in a state where the brushless motor 3 is positioned inside the motor case 22, and is supported by the motor support portion 213 (the handle housing 21) through the motor case 22.

The sensor board 4 has an annular shape in a front view, and is positioned rearward of the stator 33 of the brushless motor 3. Three Hall elements 41 are mounted on the front surface of the sensor board 4 for detecting the rotational position of the rotor 32. The three Hall elements 41 are mounted on the front surface of the sensor board 4. The three Hall elements 41 are arrayed at intervals of 60 degrees in the circumferential direction of the rotation shaft 31. Each of the three Hall elements 41 is connected to the controller 10 through a signal wire 41A and is configured to output, to the controller 10, a signal for detecting the rotational position of the sensor magnet 32A. As illustrated in FIG. 3, the signal wires 41A extend from the lower portion of the sensor board 4 and are connected to the controller 10 through the communication hole 221a.

Turning back to FIG. 2, the fan 5 is a centrifugal fan, and is positioned frontward of the stator 33 of the brushless motor 3. The fan 5 is coaxially fixed to the rotation shaft 31 so as to rotate coaxially and integrally with the rotation shaft 31. The fan 5 is configured to be rotatably driven integrally with rotation of the rotation shaft 31 to generate cooling air flows flowing from the plurality of inlet holes 2a to the plurality of exhaust holes 2b within the housing 2. Further, the position in the frontward/rearward of the fan 5 is coincident with the positions in the frontward/rearward position of the two exhaust holes 2b. In other words, the fan 5 overlaps with the two exhaust holes 2b as viewed in the upward/downward direction. Hence, cooling air can be smoothly discharged toward the outside of the housing 2 through the two exhaust holes 2b.

Figure 4:
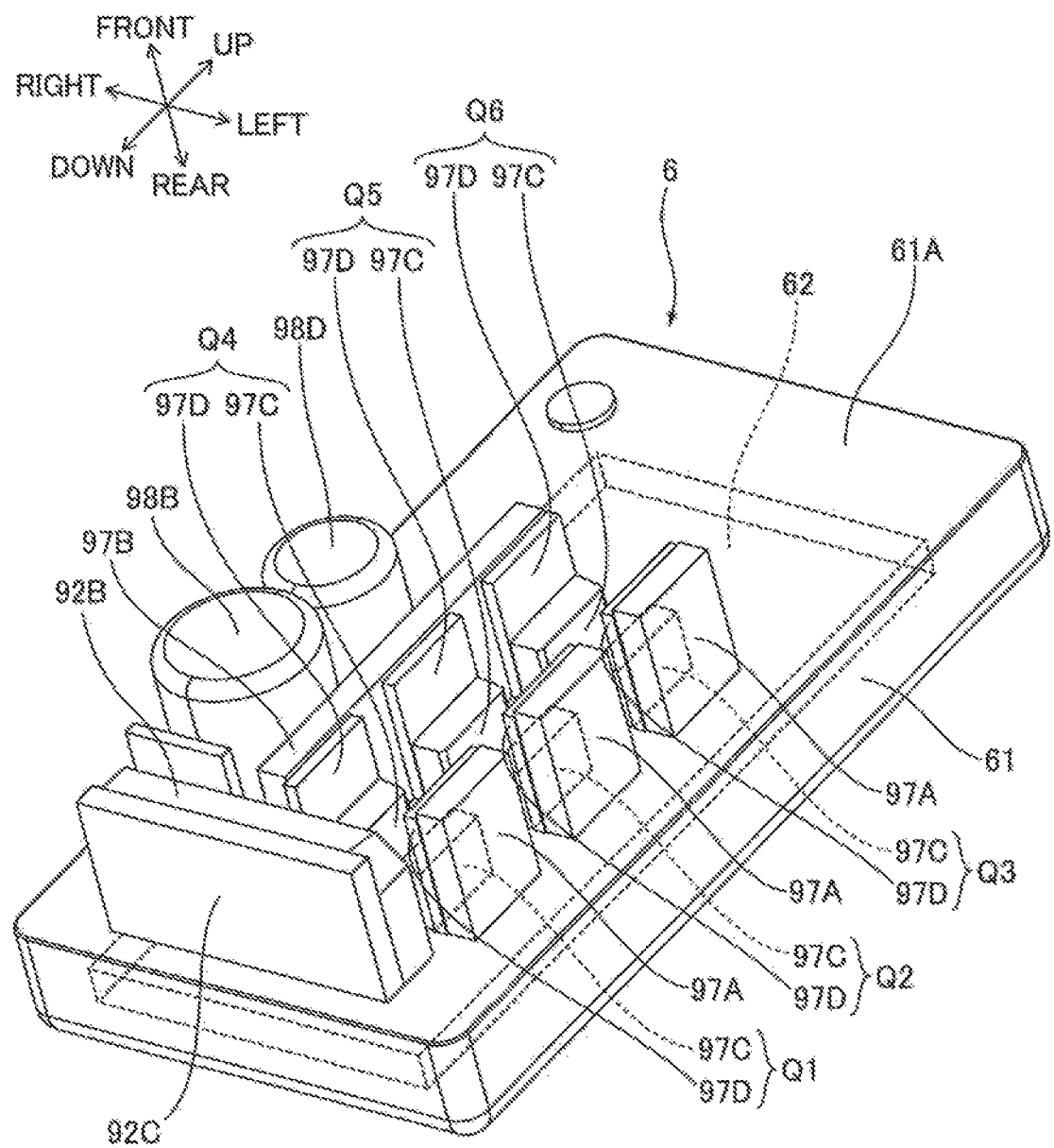
FIG. 4 is a perspective view illustrating a board portion in the saber saw according to the first embodiment of the present invention.

As illustrated in FIGS. 2 through 4, the board portion 6 includes the board accommodating portion 61 and the circuit board 62. The board accommodating portion 61 is a box-shaped container made of resin (specifically, a bottomed box-shaped container). The hoard accommodation portion 61 is accommodated inside the motor support portion 213 and opens frontward (opening toward the motor case 22). As illustrated in FIG. 7, the board accommodating portion 61 has a rectangular shape (i.e., a rectangle) elongated in the upward/downward direction in a front view. As illustrated in FIG. 3, the upper end of the board accommodating portion 61 is positioned below the upper end of the sleeve portion 222 and above the upper end of the bearing support portion 221A, and the lower end of the board accommodating portion 61 is positioned below the lower end of the sleeve portion 222. Hence, a part of the board accommodating portion 61 is positioned between the motor case 22 and a rear wall portion 213C of the motor support portion 213. The rear wall portion 213C constitutes the rear end portion of the motor support portion 213, and faces the grip portion 211 in the frontward/rearward direction. Further, the board accommodating portion 61 is nipped by the handle housing 21 with long sides of the board accommodating portion 61 along the upward/downward direction and narrow sides thereof along the leftward/rightward direction. That is, the thickness direction of the board accommodating portion 61 is along the frontward/rearward direction that is the longitudinal direction of the saber saw 1. This structure prevents the handle housing 21 from increasing in size in the frontward/rearward direction, to thus prevent the saber saw 1 from increasing in size in the frontward/rearward direction (the longitudinal direction). The board accommodating portion 61 is an example of a "board case" in the present invention.

The circuit board 62 is a flat plate-like board and is accommodated in the board accommodating portion 61 with the thickness direction of the circuit board 62 coincident with the frontward/rearward direction. On the circuit board 62, the controller 10 and a plurality of circuit elements (a diode 92A, switching elements Q1 through Q6, and other elements described later) constituting the power supply circuit 9 are mounted. Note that, the board accommodating portion 61 is filled with urethane resin 61A with the circuit board 62 accommodated in the board accommodating portion 61. This structure can provide improved insulation between the plurality of circuit elements mounted on the circuit board 62. The circuit board 62 is an example of a "board" in the present invention.

As illustrated in FIG. 2, the motion converting portion 7 includes a bevel gear 71, a pin 72, and a pin guide 73. The motion converting portion 7 is configured to convert rotation of the rotation shaft 31 of the brushless motor 3 into reciprocal movement in the frontward/rearward direction, and to transmit the reciprocal movement to the reciprocal movement portion 8. That is, the motion converting portion 7 is configured to convert rotation of the brushless motor 3 into reciprocal movement of the reciprocal movement portion 8.

The bevel gear 71 is positioned at the lower portion of the interior of the gear case 23, and is supported by the gear case 23 so as to rotatable about a rotation axis extending in the upward/downward direction. The bevel gear 71 is in meshing engagement with the pinion gear 31A of the rotation shaft 31.

The pin 72 has a generally solid cylindrical shape extending in the upward/downward direction. The pin 72 is fixed to the bevel gear 71 by force-fitting, and is positioned spaced away from the rotation axis of the bevel gear 71 in the radial direction thereof. The upper portion of the pin 72 protrudes upward from the upper surface of the bevel gear 71.

The pin guide 73 has a generally rectangular parallelepiped shape extending in the leftward/rightward direction. The pin guide 73 is provided within the gear case 23 so as to be movable in the frontward/rearward direction. The pin guide 73 is formed with a pin receiving groove 73a. The pin receiving groove 73a is recessed upward from the lower surface of the pin guide 73, and extends in the leftward/rightward direction. The pin receiving groove 73a has a width in the frontward/rearward direction slightly greater than the diameter of the pin 72. The upper end portion of the pin 72 is accommodated in the pin receiving groove 73a through a needle bearing. Hence, relative movement in the frontward/rearward direction between the pin guide 73 and the pin 72 is restricted, while relative movement in the leftward/rightward therebetween is permitted.

The reciprocal movement portion 8 is supported by the gear case 23 so as to be reciprocally movable along an axis A extending in the frontward/rearward direction within the gear case 23 (i.e., so as to be reciprocally movable in the frontward/rearward direction within the gear case 23). The reciprocal movement portion 8 is positioned on the opposite side of the motor support portion 213 from the grip portion 211 in the frontward/rearward direction. The reciprocal movement portion 8 includes a shaft 81 and a blade attachment portion 82. The frontward/rearward direction is an example of a "first direction" in the present invention. The axis A is an example of an "axis extending in the first direction".

The shaft 81 has a generally hollow cylindrical shape extending in the frontward/rearward direction, and is supported by the gear case 23 so as to be reciprocally movable in the frontward/rearward direction. The shaft 81 is fixed to the pin guide 73 so as to move together with the pin guide 73 in the frontward/rearward direction.

The blade attachment portion 82 is provided at the front end portion of the shaft 81. The blade 13 is attachable to and detachable from the blade attachment portion 82.

Next, the electrical configuration in the saber saw 1 will be described. As illustrated in FIG. 5, the saber saw 1 includes the power supply circuit 9 and the controller 10.

The power supply circuit 9 is configured to supply electric power of the external power source P to the brushless motor 3. The power supply circuit 9 includes a noise filter circuit 91, a rectification circuit 92, a first positive line 93, the switch 211D, a second positive line 94, a negative line 95, a smoothing circuit 96, an inverter circuit 97, and a constant voltage power supply circuit 98. Incidentally, the rectification circuit 92, the first positive line 93, the second positive line 94, the negative line 95, a part of the smoothing circuit 96, the inverter circuit 97, and the constant voltage power supply circuit 98 are mounted on the circuit board 62.

The noise filter circuit 91 is a circuit for reducing noise, and is mounted on a filter circuit board 91A (FIGS. 2 and 3). The filter circuit board 91A is accommodated in a filter circuit accommodating portion 91F disposed inside the first connecting portion 212A. The filter circuit accommodating portion 91F is a container which is made of resin and has a bottomed box shape opening upward.

As illustrated in FIG. 5, the noise filter circuit 91 includes a first terminal 91B, a second terminal 91C, a choke coil 91D, and a capacitor 91E. The first terminal 91B and the second terminal 91C are terminals across which voltage of the external power source P is applied in a state where the power source cord 211C is connected to the external power source P.

The choke coil 91D and the capacitor 91E are filter elements for reducing noise propagated to the power supply circuit 9 from the external power source P. The choke coil 91D is connected in series between the rectification circuit 92 and the external power source P, while the capacitor 91E is connected in parallel to the external power source P. Each of the choke coil 91D and the capacitor 91E is an example of a "filter element" in the present invention.

As illustrated in FIGS. 2 and 3, the choke coil 91D and the capacitor 91E are disposed (accommodated) inside the first connecting portion 212A of the handle housing 21 in a state where the choke coil 91D and the capacitor 91E are mounted on the filter circuit board 91A accommodated in the filter circuit accommodating portion 91F. The choke coil 91D and the capacitor 91E are positioned between the board portion 6 and a base end portion 211F of the power source cord 211C in the frontward/rearward direction. Hence, the choke coil 91D electrically connected in series between the external power source P and the rectification circuit 92 is positioned closer to the power source cord 211C than the rectification circuit 92 is to the power source cord 211C. Hence, the length of a wiring for connecting the choke coil 91D to the power source cord 211C and the length of a wiring for connecting the choke coil 91D to the rectification circuit 92 can be shortened in comparison with a structure where the rectification circuit 92 is positioned closer to the power source cord 211C than the choke coil 91D is to the power source cord 211C.

Turning back to FIG. 5, the rectification circuit 92 is a diode bridge circuit including four diodes 92A (four rectifier elements), and is configured to rectify AC voltage outputted from the external power source P through the noise filter circuit 91 and output the rectified voltage to the smoothing circuit 96. In other words, the rectification circuit 92 is configured to convert AC voltage outputted from the external power source P into DC voltage and outputs the resultant voltage to the smoothing circuit 96. Further, the rectification circuit 92 (the four diodes 92A) is a circuit element that generates heat due to the supply of power to the brushless motor 3 by the power supply circuit 9, and the heat generation amount of the rectification circuit 92 due to the supply of power is large. Therefore, the rectification circuit 92 (the four diodes 92A) is a circuit element that is given a high priority for cooling.

As illustrated in FIGS. 3 and 4, the rectification circuit 92 is mounted on the circuit board 62 as a rectification circuit unit 92B. The rectification circuit unit 92B is a component constructed by unitizing the rectification circuit 92, a case for accommodating the rectification circuit 92, a plurality of terminals connected to the rectification circuit 92 and protruding from the case, and other parts. The rectification circuit unit 92B is mounted on the circuit board 62 such that the rectification circuit unit 92B protrudes frontward from the lower portion of the front surface of the circuit board 62 and extends in the leftward/rightward direction. The rear portion of the rectification circuit unit 92B is embedded in the urethane resin 61A, while the remaining portion of the rectification circuit unit 92B is exposed to the internal space of the motor support portion 213. Further, the lower surface of the rectification circuit unit 92B is connected to a radiation fin 92C made of metal. Each of the rectification circuit 92 and the rectification circuit unit 92B is an example of "circuit element" in the present invention.

Turning back to FIG. 5, the first positive line 93 connects the rectification circuit 92 to the switch 211D of the switch mechanism portion 211A, and the second positive line 94 connects the switch 211D to the inverter circuit 97. That is, the first positive line 93 and the second positive line 94 are connected to each other through the switch 211D. Further, the negative line 95 is connected to a GND (not illustrated), and connects the rectification circuit 92 to the inverter circuit 97. When the switch 211D is placed in its ON-state, the first positive line 93 is electrically connected to the second positive line 94, enabling power supply from the external power source P to the inverter circuit 97. On the other hand, when the switch 211D is placed in its OFF-state, the first positive line 93 is disconnected from the second positive line 94, disabling power supply from the external power source P to the inverter circuit 97.

The smoothing circuit 96 is connected between the rectification circuit 92 and the inverter circuit 97. The smoothing circuit 96 is configured to smoothen DC voltage outputted from the rectification circuit 92 and output the resultant voltage to the inverter circuit 97. The smoothing circuit 96 includes a first capacitor 96A, a second capacitor 96B, and a resistor 96C.

The first capacitor 96A is a polarized electrolytic capacitor and positioned between the first positive line 93 and the negative line 95. In the present embodiment, the first capacitor 96A is a capacitor whose capacitance is about 180 µF. Note that, although the capacitance of the first capacitor 96A is about 180 µF in the present embodiment, the capacitance of the first capacitor 96A is not limited to this but a small-size capacitor whose capacitance ranges from 40 to 200 µF can also be employed. The first capacitor 96A is an example of a "capacitor" in the present invention.

As illustrated in FIGS. 2 and 3, the first capacitor 96A has a generally columnar shape, and is supported by ribs (not illustrated) inside the motor support portion 213. The first capacitor 96A is disposed (accommodated) in a posture where its axial direction is generally coincident with the upward/downward direction, and is positioned above the board portion 6 (the board accommodating portion 61) and rearward of the motor case 22, Further, the upper end of the first capacitor 96A is positioned above the upper end of the motor case 22, and the lower end of the first capacitor 96A is positioned below the upper end of the motor case 22.

Turning back to FIG. 5, the second capacitor 96B is a non-polarized film capacitor, and is connected between the second positive line 94 and the negative line 95. In a state where the switch 211D is in its ON-state, the first capacitor 96A and the second capacitor 96B are connected in parallel. In the present embodiment, the second capacitor 96B is a capacitor whose capacitance is about 4.7 µF. Further, the second capacitor 96B is smaller in size than the first capacitor 96A.

The resistor 95C is a resistor for discharge, and is connected between the second positive line 94 and the negative line 95. The resistor 95C and the second capacitor 96B are connected in parallel to each other.

The inverter circuit 97 includes the six switching elements Q1 through Q6 that are connected in a three-phase bridge configuration. The switching elements Q1 through Q6 are MOSFETs (metal oxide semiconductor field effect transistors). However, the switching elements Q1 through Q6 are not limited to MOSFETs. For example, the switching elements Q1 through Q6 may be IGBTs (insulated gate bipolar transistors). Further, the switching elements Q1 through Q6 are circuit elements that generate heat due to the power supply to the brushless motor 3 by the power supply circuit 9, and the heat generation amounts of the switching elements Q1 through Q6 due to the supply of power are large. Therefore, the switching elements Q1 through Q6 are circuit elements that are given a high priority for cooling.

The gate of each of the switching elements Q1 through Q6 is connected to the controller 10, and the switching elements Q1 through Q6 are configured to perform switching operations on the basis of control signals inputted from the controller 10. The drain or source of each of the switching elements Q1 through Q6 is connected to one of the stator coils U, V, W. More specifically, the drain or source of each of the switching elements Q1 through Q6 is connected, by a corresponding one of a plurality of wirings 2C illustrated in FIG. 3, to a circuit formed on the sensor board 4, and is connected to one of the stator coils U, V, W through the circuit. Each of the plurality of wirings 2C extends from the corresponding one of the switching elements Q1 through Q6 (i.e., extends from the power supply circuit 9) to the inside of the motor case 22 through the communication hole 221a of the motor case 22, and is connected to the sensor board 4. In other words, the plurality of wirings 2C extend from the interior of the motor support portion 213 to the interior of the motor case 22 through the communication hole 221a thereof.

As illustrated in FIGS. 3 and 4, the switching elements Q1 through Q6 have the same shape as each other, and each of the switching elements Q1 through Q6 includes a switching element body 97C and a heat sink 97D connected to the switching element body 97C. The switching element body 97C and heat sink 97D of each of the switching elements Q1 through Q6 are mounted on the circuit board 62 such that the switching element body 97C and heat sink 97D protrude frontward from the front surface of the circuit board 62 and extend in the upward/downward direction. In each of the switching elements Q1 through Q6, the dimension in the frontward/rearward direction of the heat sink 97D of is greater than that of the switching element body 97C and the dimension in the upward/downward direction of the heat sink 97D is approximately equal to that of the switching element body 97C. Further, each of the rear end portions of the switching elements Q1 through Q6 (that is, each of the rear end portions of the switching element body 97C and heat sink 97D) is embedded in the urethane resin 61A, while each of the remaining portions of the switching elements Q1 through Q6 is exposed to the internal space of the motor support portion 213.

As illustrated in FIG. 4, the switching elements Q1 through Q3 are disposed at the left portion of the front surface of the circuit board 62, and are arrayed in the upward/downward direction. The left surface of the heat sink 97D of each of the switching elements Q1 through Q3 is connected to a corresponding one of radiation fins 97A made from metal by a metallic fixing member such as a screw. The dimension in the frontward/rearward direction of each of the radiation fins 97A is slightly greater than that of the heat sink 97D.

The switching elements Q4 through Q6 are disposed rightward of the switching elements Q1 through Q3 and are arrayed in the upward/downward direction. The switching element row constituted by the switching elements Q4 through Q6 arrayed in the upward/downward direction and the switching element row constituted by the switching elements Q1 through Q3 arrayed in the upward/downward direction are arranged side by side in the leftward/rightward direction. Further, the switching elements Q4, Q5, and Q6 face the switching elements Q1, Q2, and Q3 in the leftward/rightward direction, respectively. The right surface of the heat sink 97D of each of the switching elements Q4 through Q6 is connected to a radiation fin 97B made from metal by a metallic fixing member such as a screw. The radiation fin 97B extends over the switching elements Q4 through Q6 in the upward/downward direction, and the dimension in the frontward/rearward direction of the radiation fin 978 is approximately equal to that of the radiation fin 97A.

As illustrated in FIG. 5, the constant voltage power supply circuit 98 is connected between the first positive line 93 and the negative line 95. The constant voltage power supply circuit 98 includes a diode 98A, a capacitor 98B, an IPD circuit 98C, a capacitor 98D, and a regulator 98E, and is configured to convert DC voltage outputted from the rectification circuit 92 into stabilized reference voltage and to supply the resultant voltage to the controller 10. As illustrated in FIG. 4, the capacitor 98B and the capacitor 98D are mounted on the circuit board 62 such that these capacitors 98B and 98D protrude frontward from the front surface of the circuit board 62 at positions rightward of the radiation fin 978.

The controller 10 includes a processor, a ROM, and a RAM, etc. those not illustrated, and is configured to control the inverter circuit 97 to drive the brushless motor 3. The controller 10 is configured to detect the rotational position of the sensor magnet 32A on the basis of signals outputted from the three Hall elements 41 to detect the rotational position of the rotor 32, and to generate control signals for switching the switching elements Q1 through Q6 between their ON-state and OFF-state on the basis of the detection results. The controller 10 outputs the control signals to the switching elements Q1 through Q6, and sequentially change-over coils to be energized among the stator coils U, V, W to drive and rotate the rotor 32 in a predetermined rotational direction.

Here, with reference to FIG. 6, description will be made to the positional relationship between the three inlet holes 2a formed in the left side wall 213B of the motor support portion 213, the plurality of communication holes 221a, the rectification circuit unit 92B, and the switching elements Q1 through Q3. In the following description, the lowermost inlet hole 2a among the three inlet holes 2a will be referred to as "inlet hole 2c", and the uppermost inlet hole 2a will be referred to as "inlet hole 2d", and the remaining inlet hole 2a will be referred to as "inlet hole 2e". Further, the uppermost communication hole 221a among the plurality of communication holes 221a formed in the motor case 22 will be referred to as "communication hole 221b", and the lowermost communication hole 221a will be referred to as "communication hole 221c". Note that, the fixing member for fixing the radiation fins 97A to the switching elements Q1 through Q3 are omitted for simplicity in FIG. 6. The same is true with respect to FIGS. 2 and 3.

Figure 6:
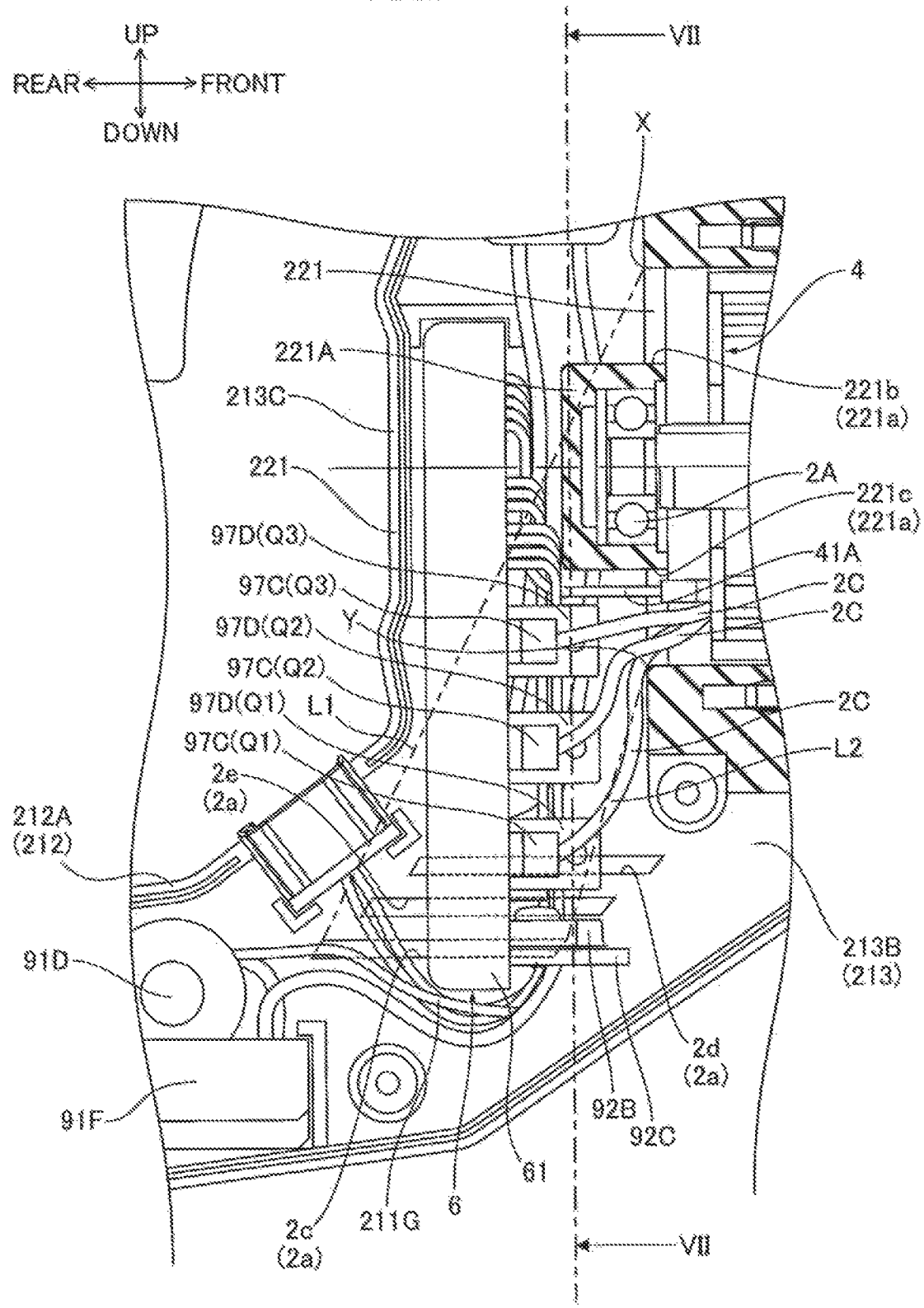
FIG. 6 is a view for description of positional relationship between inlet holes, communication holes, a rectification circuit case, and switching elements in the saber saw according to the first embodiment of the present invention.

As illustrated in FIG. 6, the inlet hole 2c has a portion overlapping with the rectification circuit unit 92B as viewed in the leftward/rightward direction. Hence, in the motor support portion 213, the cooling air that flows from the overlapping portion toward the communication holes 221b and 221c, firstly cools the rectification circuit unit 92B (rectification circuit 92). Further, since the direction of the cooling air introduced through the overlapping portion is a direction perpendicular to the axial direction of the rotation shaft 31 (the rightward direction in the present embodiment), the cooling air immediately after introduced through the overlapping portion is likely to hit on the rectification circuit unit 92B. As a result, effective cooling to the rectification circuit 92 can be performed.

The inlet hole 2d has a portion overlapping with the switching element Q1 (the switching element body 97C and the heat sink 97D), and the radiation fin 97A connected to the switching element Q1 as viewed in the leftward/rightward direction. Hence, in the motor support portion 213, the cooling air that flows from the overlapping portion toward the communication holes 221b and 221c, firstly cools the switching element Q1. Further, since the direction of the cooling air introduced through the overlapping portion is a direction perpendicular to the axial direction of the rotation shaft 31 (the rightward direction in the present embodiment), the cooling air immediately after introduced through the overlapping portion is likely to hit on the switching element Q1 (the switching element body 97C and the heat sink 97D) and the radiation fin 97A connected to the switching element Q1. As a result, effective cooling to the switching element Q1 can be performed. Further, the front portion of each of the inlet holes 2d and 2e overlaps with the rear portion of the motor case 22 in the axial direction of the rotation shaft 31 (that is, in the frontward/rearward direction).

The switching elements Q1 through Q3 and three radiation fins 97A are positioned in an area defined between a line segment L1 connecting the rear end of the inlet hole 2c to the upper end X of the rear open end of the communication hole 221b and a line segment L2 connecting the front end of the inlet hole 2c to the lower end Y of the rear open end of the communication hole 221c. The same is true with respect to the inlet holes 2d and 2e. Accordingly, in the motor support portion 213, the cooling air that flows from the inlet holes 2c, 2d, and 2e toward the communication holes 221b and 221c, securely passes through the switching elements Q1 through Q3 and the three radiation fins 97A. Hence, the switching elements Q1 through Q3 can be effectively cooled.

Further, the front end portion of each of the inlet holes 2c, 2d, and 2e is positioned between the board accommodating portion 61 and the communication hole 221c (or the communication hole 221b) in the frontward/rearward direction. In other words, each of the inlet holes 2c, 2d, 2e has a portion positioned frontward of the board accommodating portion 61 and rearward of the communication hole 221c (or the communication hole 221b). This structure enables cooling air to more smoothly flow to enhance cooling efficiency in comparison with a structure in which each of the inlet holes 2c, 2d, and 2e does not have a portion positioned frontward of the board accommodating portion 61 (for example, a structure in which each of the entire inlet holes 2c, 2d, and 2e is positioned rearward of board accommodating portion 61).

Specifically, in the structure in which, like the present embodiment, the brushless motor 3 is employed as the drive source of the saber saw 1 and an AC power source (the external power source P in the present embodiment) is used as the power source for the brushless motor 3, it is necessary to provide the rectification circuit 92 and the switching elements Q1 through Q6 (the inverter circuit 97) for driving the brushless motor 3. This leads to an increase in size of the circuit board 62 and the board accommodating portion 61. Accordingly, in order to efficiently accommodate the large size board accommodating portion 61 within the housing 2, the present embodiment employs the configuration in which the board accommodating portion 61 is nipped and supported by the handle housing 21, not a configuration in which the board accommodating portion 61 is supported by the brushless motor 3 or the motor case 22. However, in the configuration in which the board accommodating portion 61 is nippingly supported by the handle housing 21, there needs to be employed a structure in which ribs or other members for the handle housing 21 to nippingly support the board accommodating portion 61 (the right rib portion 214 and the left rib portion 215 in the present embodiment) are provided like the present embodiment, or a structure in which the inner wall of the handle housing 21 is in contact with or positioned close to the board accommodating portion 61 for nippingly supporting the board accommodating portion 61. These structures cause a problem of narrowing a part of the cooling air passage in the handle housing 21. Particularly in a case where the board accommodating portion 61 is disposed with its thickness direction along the frontward/rearward direction for making the handle housing 21 compact as described above, the above problem is likely to occur since the long sides and narrow sides of the board accommodating portion 61 are more likely to be positioned close to the inner wall of the handle housing 21.

In the present embodiment as illustrated in FIG. 7, the space S that is provided between the left side surface (long side) of the board accommodating portion 61 and the inner surface of the left side wall 213B of the motor support portion 213 is narrow, and the right rib portion 214 and the left rib portion 215 are provided in the narrow space. In the present embodiment, the cooling air flows that flow toward the communication hole 221c (or the communication hole 221b) positioned at approximately the center portion in the leftward/rightward direction of the housing 2 from the portions of the inlet holes 2c, 2d, and 2e which are rearward of the board accommodating portion 61 (in other words, the external air that is introduced through the portions of the inlet holes 2c, 2d, and 2e which are positioned rearward of the board accommodating portion 61 into the interior of the handle housing 21) must pass through the above-described space S (the narrow spaces where the right rib portion 214 and the left rib portion 215 are provided and which are positioned at the most outward regions in the internal space of the handle Musing 21). Hence, in this structure, the cooling air flows may not smoothly flow.

Assuming that the present embodiment employed a structure in which each of the inlet holes 2c, 2d, and 2e does not have the portion positioned frontward of the board accommodating portion 61 (for example, a structure in with each of the inlet holes 2c, 2d, and 2e in its entirety is positioned rearward of the board accommodating portion 61), the almost entire air introduced through the inlet holes 2c, 2d, and 2e must pass through the space S. Therefore, in this assumed configuration, cooling air may not smoothly flow and cooling efficiency may thus be lowered. In contrast, according to the present embodiment, since each of the inlet holes 2c, 2d, and 2e has the portion positioned frontward of the board accommodating portion 61 and rearward of the communication hole 221c (or the communication hole 221b), the air introduced through the portions can reach the communication hole 221c (or the communication hole 221b) without passing through the space S, that is, without being blocked by the board accommodating portion 61 and the structure for nipping the board accommodating portion 61. As a result, smooth cooling air flows can be attained, thereby enhancing cooling efficiency. In other words, since the portion of the inlet hole 2a and the portions of the circuit elements are provided in a space connecting the motor case 22 (the communication hole 221c) and the nipping position where the board accommodating portion 61 is nipped, smooth cooling to the circuit elements can be attained, Note that, the same, is applied with respect to the three inlet holes 2a formed in the right side wall 213A and the space T defined between the right side surface of the board accommodating portion 61 and the right side wall 213A of the motor support portion 213.

Note that, the handle housing 21 is bilaterally symmetrical as described above. Therefore, the positional relationship between the three inlet holes 2a formed in the right side wall 213A, the plurality of communication holes 221a, the rectification circuit unit 92B, and the switching elements Q4 through Q6 is substantially the same as the positional relationship between the three inlet holes 2a formed in the left side wall 213B, the plurality of communication holes 221a, the rectification circuit unit 92B, and the switching elements Q1 through Q3. Accordingly, description as to the positional relationship among the three inlet holes 2a formed in the right side wall 213A, the plurality of communication holes 221a, the rectification circuit unit 92B, and the switching elements Q4 through Q6 will be omitted.

Next, the positional relationships of the switching elements Q1 through Q6, the three radiation fins 97A, the radiation fin 97B, the rectification circuit unit 92B, and the radiation fin 92C relative to the motor case 22 will be described.

As illustrated in FIG. 6, the front end of each of the switching elements Q1 through Q3, the rectification circuit unit 92B (that is, the rectification circuit 92), and the radiation fin 92C is positioned frontward of the rear end of the motor case 22 (that is, the rear end of the bearing support portion 221A). That is, each of the switching elements Q1 through Q3, the rectification circuit unit 92B, and the radiation fin 92C has a part overlapping with the motor case 22 in the axial direction of the rotation shaft 31 (that is, in the frontward/rearward direction). More specifically, the front portion of each of the heat sink 97D of the switching element Q1, the heat sink 97D of the switching, elements Q2, the heat sink 97D of the switching element Q3, the rectification circuit unit 92B, and the radiation fin 92C overlaps with the rear end portion of the motor case 22 (that is the rear portion of the bearing support portion 221A) in the axial direction of the rotation shaft 31. Further, the radiation fin 92C overlaps also with the ball bearing 2A in the axial direction of the rotation shaft 31.

Further, although not illustrated in FIG. 6, the front end of each of the three radiation fins 97A, the switching elements Q4 through Q6, the radiation fin 97B, the capacitor 98B and the capacitor 98D is positioned frontward of the rear end of the motor case 22. That is, each of the three radiation fins 97A, the switching elements Q4 through Q6, the radiation fin 97B, the capacitor 98B, and the capacitor 98D has a part overlapping with the motor case 22 in the axial direction of the rotation shaft 31. More specifically, the front portion of each of the three radiation fins 97A, the heat sink 97D of the switching element Q4, the heat sink 97D of the switching elements Q5, the heat sink 97D of the switching element Q6, the radiation fin 97B, the capacitor 98B and the capacitor 98D overlaps with the rear end portion of the motor case 22 (the rear portion of the bearing support portion 221A) in the axial direction of the rotation shaft 31.

As such, according to the present embodiment, since each of the switching elements Q1 through Q6, the three radiation fins 97A, the radiation fin 97B, the rectification circuit unit 92B, the radiation fin 92C, and the capacitors 98B and 98D is disposed overlapping with the motor case 22 in the axial direction of the rotation shaft 31, the board accommodating portion 61 can be disposed close to the motor case 22 sufficiently. In other words, the board accommodating portion 61 can be disposed close enough to the motor case 22 since the components protruding from the box-like board accommodating portion 61 is disposed overlapping with the motor case 22 in the axial direction of the rotation shaft 31. This structure can reduce the dimension in the frontward/rearward of the handle housing 21, which enables to reduction of the dimension in the frontward/rearward of the saber saw 1. Note that, in the handle housing 21, the reduction in size thereof reduces the region for forming the inlet holes, which causes a concern that cooling performance with respect to the board accommodating portion 61 is lowered. However, as described above, lowering of the cooling efficiency can be suppressed since the inlet holes are positioned so as to communicate with the space inside the motor support portion 213 which space is defined between the board accommodating portion 61 and the motor case 22. That is, the present embodiment can achieve both reduction in size of the handle housing 21 and suitable cooling to the board accommodating portion 61. Further, since the board accommodating portion 61 can be disposed close to the motor case 22 sufficiently, the plurality of wirings 2C connecting the switching elements Q1 through Q6 to the brushless motor 3 positioned in the motor case 22 and various wirings extending from the circuit board 62 to the brushless motor 3 can be reduced in their lengths. Particularly, the lengths of the signal wires 41A connecting the controller 10 to the sensor board 4 can be shortened, which can suppress noise from entering the signals transmitted through the signal wires 41A. Note that, in the present embodiment, the heat sink 97D of each of the switching elements Q1 through Q6 overlaps with the motor case 22 in the axial direction of the rotation shaft 31, whereas the switching element body 97C of each of the switching elements Q1 through Q6 does not overlap with the motor case 22 in the axial direction of the rotation shaft 31. However, the present invention is not limited to this configuration. For example, both the switching element body 97C and heat sink 97D of each of the switching elements Q1 through Q6 may overlap with the motor case 22 in the axial direction of the rotation shaft 31. In the latter case, the board accommodating portion 61 can be disposed closer to the motor case 22.

Further, in the present embodiment, the position of the center of the board accommodating portion 61 is offset from the position of the center axis of the rotation shaft 31. To be more specific, the center of the board accommodating portion 61 is deviated downward from the position of the center axis of the rotation shaft 31 (the position of the center in both the upward/downward direction and the leftward/rightward direction of the bearing support portion 221A). This structure can facilitate disposing the components protruding from the board accommodating portion 61 so that they can overlap with the motor case 22 in the axial direction of the rotation shaft 31. This structure is particularly effective to a structure in which most of the circuit mount surface of the circuit board 62 is occupied by the large circuit elements, like the present embodiment.

Next, operations in the saber saw 1 will be described. For performing cutting operation, generally, the operator attaches the blade B to the blade attachment portion 82, then grips the grip portion 211 with his one hand, and holds the front portion (small diameter portion) of the gear case 23 with the other hand. In this state, the operator performs a pulling operation to the trigger switch 211B by the finger of the hand gripping the grip portion 211, so that the switch 21 ID is placed into its closed state (its ON-state) and the start signal is outputted from the signal output portion 211E to the controller 10.

Upon the output of the start signal to the controller 10, the controller 10 starts to drive the brushless motor brushless motor 3 and thus the rotation shaft 31 starts to rotate. When the rotation shaft 31 starts to rotate, the bevel gear 71 is rotated by the rotation of the rotation shaft 31 and thus the pin 72 circularly moves around the rotation axis of the bevel gear 71. Only the motion component in the frontward/rearward direction in the circular motion is transmitted to the pin guide 73, so that the pin guide 73, the reciprocal movement portion 8, and the blade B attached thereto are integrally reciprocally moved in the frontward/rearward direction. The workpiece can be cut by the reciprocally moving blade B.

Next, cooling air flows generated in the housing 2 by the fan 5 will be described with reference to FIG. 8. When the driving of the brushless motor 3 is started and the rotation shaft 31 starts to rotate, the fan 5 also starts to rotate integrally with the rotation shaft 31. Air is introduced into the motor support portion 213 through the six inlet holes 2a by the rotation of the fan 5, so that cooling air flows from the six inlet holes 2a to the two exhaust holes 2b inside the housing 2 are generated. A plurality of broken line arrows illustrated in FIG. 8 indicates typical cooling air flows generated inside the housing 2 in the present embodiment.

Figure 8:
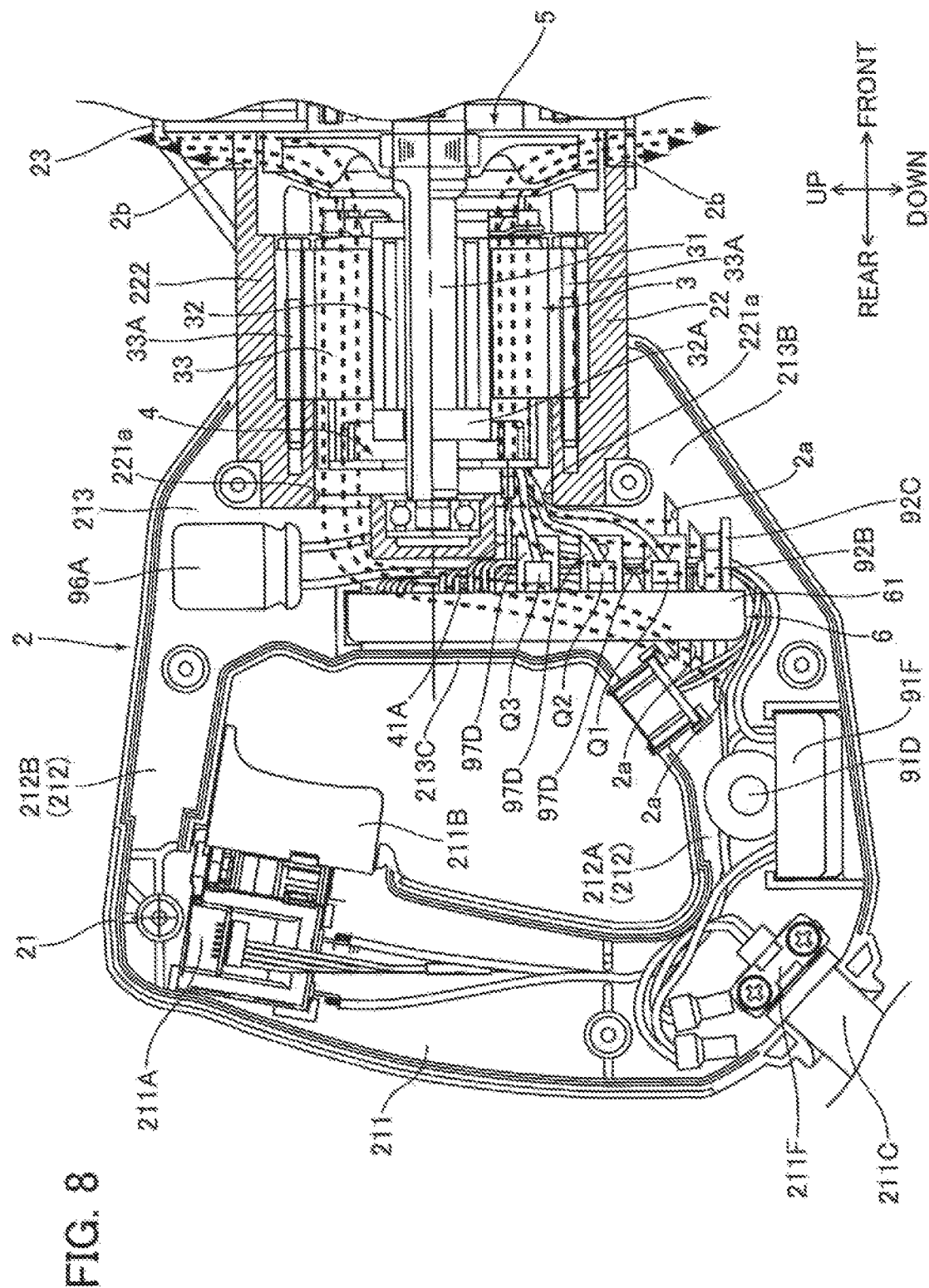
FIG. 8 is a view for description of cooling air flows in the saber saw according to the first embodiment of the present invention.

As illustrated in FIG. 8, the cooling air flows generated by the rotation of the fan 5 initially cool both the rectification circuit unit 92B (the rectification circuit 92) and the six switching elements Q1 through Q6, and thereafter, flow from the inside of the motor support portion 213 into the motor case 22 through the plurality of communication holes 221a. After the inflow of the cooling air to the motor case 22, the cooling air flows cool the brushless motor 3 while passing through the interior of the stator 33 and a gap between the stator 33 and the inner peripheral surface of the motor case 22. Then, the cooling air flows are discharged outside the housing 2 through the two exhaust holes 2b.

In this way, the cooling air flows generated by the rotation of the fan 5 first cool the rectification circuit 92 (the rectification circuit unit 92B) and switching elements Q1 through Q6, which are given a high priority for cooling. That is, the rectification circuit 92 and switching elements Q1 through Q6 those given a high priority for cooling are cooled by the cooling air flows having their lowest temperature. As a result, effective cooling can be performed with respect to the rectification circuit 92 and switching elements Q1 through Q6, that is, the circuit elements generating heat due to power supply to the brushless motor 3 by the power supply circuit 9.

As described above, the saber saw 1 according to the first embodiment of the present invention includes the housing 2 formed with the inlet hole 2a and the exhaust hole 2b, the brushless motor 3 supported by the housing 2, the power supply circuit 9 configured to supply electric power of the external power source P to the brushless motor 3, and the fan 5 driven by rotation of the brushless motor 3 to generate cooling air flow flowing in the housing 2 from the inlet hole 2a to the exhaust hole 2b. The power supply circuit 9 includes at least one circuit element (the switching elements Q1 through Q6 and the rectification circuit 92 (the diode 92A)) which generates heat due to the supply of the electric power. The housing 2 includes the handle housing 21 including the grip portion 211 and supporting the brushless motor 3. Further, the inlet hole 2a is formed in the handle housing 21, and the at least one circuit element is disposed inside the handle housing 21 and is cooled by the cooling air flow generated by the fan 5.

According to this structure, the inlet hole 2a is formed in the handle housing 21, and the circuit element (the switching elements Q1 through Q6 and the rectification circuit 92 (the diode 92A)) which generates heat upon supply of electric power to the brushless motor 3 is disposed inside the housing 2. Therefore, the circuit element can be cooled by the cooling air flow whose temperature is low. Accordingly, in the saber saw 1, a prolonged life thereof and maintenance-free are achieved by employing the brushless motor 3, and further, the circuit element generating heat upon supply of electric power to the brushless motor 3 can be effectively cooled. Further, the position of the center of gravity of the saber saw 1 may be deviated toward the gear case 23 due to the employment of the brushless motor 3 which is relatively light in weight. However, in the present embodiment, the position of the center of gravity of the saber saw 1 can be maintained at a proper position since the circuit elements are collectively disposed inside the handle housing 21. Hence, deterioration of workability can be suppressed.

Further, the saber saw 1 according to the embodiment further includes the reciprocal movement portion 8 reciprocally movably supported by the housing 2, and the motion converting portion 7 configured to convert rotation of the brushless motor 3 into reciprocal movement of the reciprocal movement portion 8. The housing 2 further includes the gear case 23 accommodating therein the motion converting portion 7. Further, the reciprocal movement portion 8 is supported by the gear case 22 so as to be reciprocally movable along the axis A extending in a first direction (the frontward/rearward direction). The handle housing 21 further includes the motor support portion 213 supporting the brushless motor 3 and a connecting portion 212 connecting the grip portion 211 and the motor support portion 213. The grip portion 211 extends in a second direction (the upward/downward direction in the embodiment) crossing the first direction, and is positioned on the opposite side of the motor support portion 213 from the reciprocal movement portion 8 in the first direction. The inlet hole 2a is formed in the motor support portion 213, and the at least one circuit element (the switching elements Q1 through Q6 and the rectification circuit 92 (the diode 92A)) is disposed inside the motor support portion 213.

According to this structure, the inlet hole 2a is formed in the motor support portion 213, and the circuit element (the switching elements Q1 through Q6 and the rectification circuit 92 (the diode 92A)) generating heat upon supply of electrical power to the brushless motor 3 is disposed inside the motor support portion 213. Therefore, the circuit element can be cooled with the cooling air flow whose temperature is low. Accordingly, effective cooling can be performed to the circuit element generating heat upon supply of electrical power to the brushless motor 3.

Further, in the present invention, the power supply cord 211C extending from the handle housing 21 and connectable to the external power source P is further provided. The power supply circuit 9 further includes the choke coil 91D configured to reduce noise that is propagated from the external power source P to the power supply circuit 9. The choke coil 91D is disposed inside the connecting portion 212.

With this structure, the choke coil 91D having a low priority for cooling is disposed inside the connecting portion 212, not inside the motor support portion 213. Therefore, the circuit element (the switching elements Q1 through Q6 and the rectification circuit 92 (the diode 92A)) which generates heat upon supply of electrical power to the brushless motor 3 can be cooled on a priority basis. As a result, effective cooling to the circuit element generating heat upon supply of electrical power to the brushless motor 3 can be further promoted.

Further, the power supply circuit 9 in the saber saw 1 includes the inverter circuit 97 configured to drive the brushless motor 3. The at least one circuit element includes a plurality of switching elements Q1-Q6 constituting the inverter circuit 97.

With this structure, the switching elements Q1 through Q6 having a high priority for cooling can be effectively cooled.

Further, in the present embodiment, the housing 2 further includes the integrally molded motor case 22, and the motor case 22 is supported by the motor support portion 213. The brushless motor 3 is accommodated in the motor case 22.

With this structure, the motor case 22 can firmly support the brushless motor 3, since the motor case 22 is integrally molded. Further, the brushless motor 3 can be supported at high accuracy while deformation and breakage of the motor case 22 can be suppressed.

Further, the communication hole 221a allowing the interior of the motor support portion 213 to be communicated with the interior of the motor case 22 is formed in one end portion (i.e., the rear end portion (the rear wall portion 221)) of the motor case 22 of the saber saw 1 in the first direction (the frontward/rearward direction), the one end portion of the motor case 22 in the first direction being closer to the grip portion 211 than another end portion of the motor case 22 in the first direction is to the grip portion 211. The cooling air flow flows into the interior of the motor case 22 through the communication hole 221a after cooling the at least one circuit element (the switching elements Q1 through Q6 and the rectification circuit 92 (the diode 92A)).

With this structure, the cooling air flow generated by the fan 5 being rotatably driven, cools not only the circuit element but also the cooling target (for example, the brushless motor 3) disposed inside the motor case 22.

Further, the saber saw 1 according to the embodiment further includes the wiring 2C extending from the power supply circuit 9 to the interior of the motor case 22 through the communication hole 221a.

This structure enables the wiring 2C to extend to the interior of the motor case 22 without separately forming an additional hole which allows the wiring 2C to pass therethrough for the wiring 2C to extend from the interior of the motor support portion 213 to the interior of the motor case 22. Hence, the process of forming the additional hole can be omitted.

Figure 9:
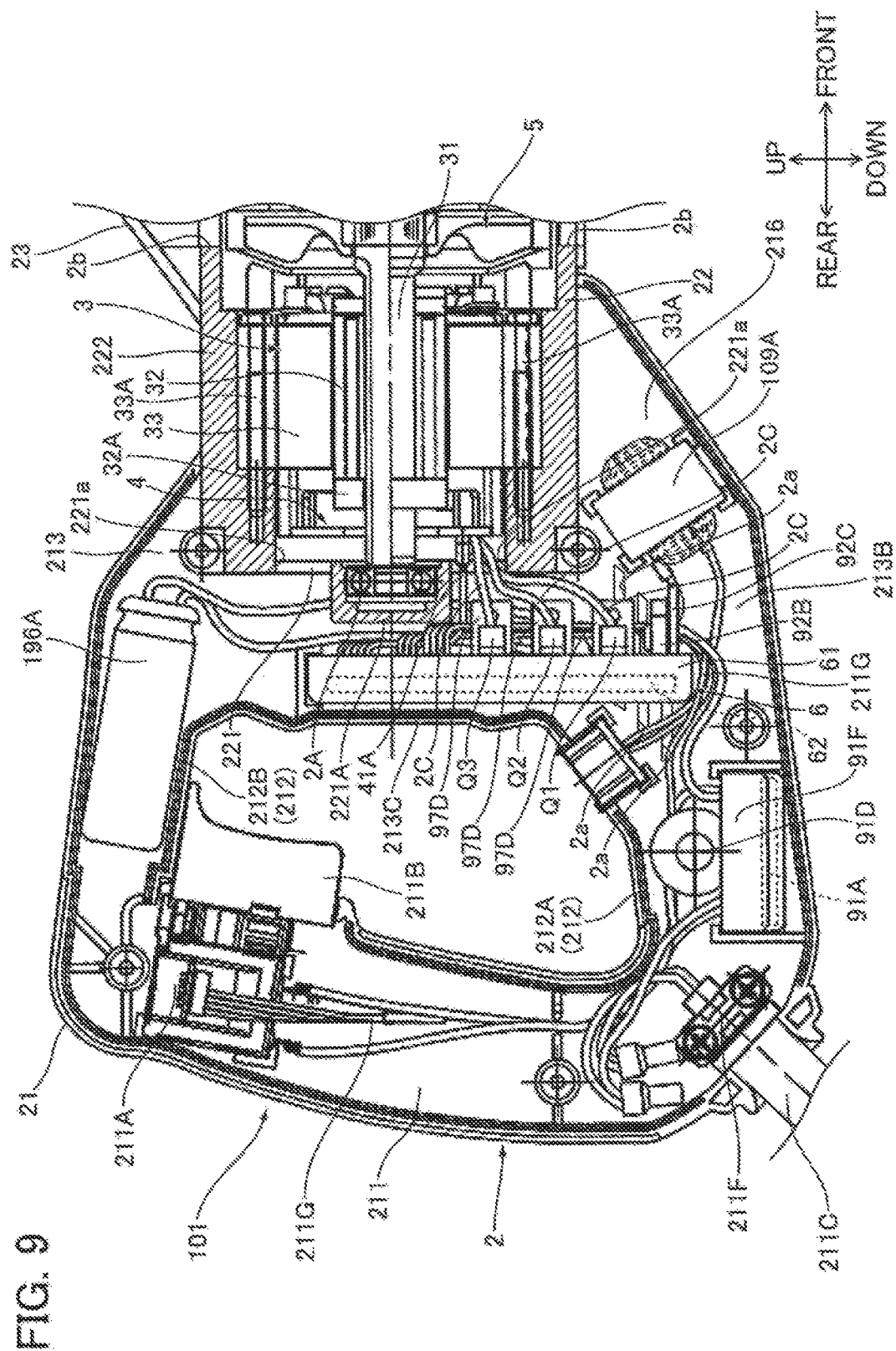
FIG. 9 is a partial enlarged cross-sectional view illustrating an internal structure of a handle housing and a motor case in a saber saw according to a second embodiment of the present invention.

Next, a saber saw 101 as an example of the power tool according to a second embodiment of the present invention will be described with reference to FIG. 9, wherein like parts and components are designated by the same reference numerals as those shown in the saber saw 1 according to the first embodiment to avoid duplicating description, and only differences from the first embodiment will be described.

First, differences between the saber saw 101 and the saber saw 1 will be described. The smoothing circuit 96 of the saber saw 101 is different from the smoothing circuit 96 of the saber saw 1 in that the smoothing circuit 96 of the saber saw 101 includes a first capacitor 196A instead of the first capacitor 96A. Further, the power supply circuit 9 of the saber saw 101 is different from the power supply circuit 9 of the saber saw 1 in that the power supply circuit 9 of the saber saw 101 includes a reactor 109A. Furthermore, the handle housing 21 of the saber saw 101 is different from the handle housing 21 of the saber saw 1 in that the handle housing 21 of the saber saw 101 includes a reactor accommodating portion 216. The saber saw 101 has the structure the same as that of the saber saw 1 except the above-described differences. Further, the cooling air flows in the saber saw 101 are the same as those in the saber saw 1.

The first capacitor 196A is a large-size capacitor whose capacitance is about 1200 µF. As illustrated in FIG. 9, the first capacitor 196A is disposed (accommodated) extending in the frontward/rearward direction over the interior of the second connecting portion 212B and the interior of the motor support portion 213. In other words, the rear portion of the first capacitor 196A is disposed (accommodated) inside the second connecting portion 212B, and the front portion of the first capacitor 196A is disposed inside the motor support portion 213.

The reactor accommodating portion 216 is a portion of the motor support portion 213, and the portion extends frontward from the lower front portion of the motor support portion 213, that is, the portion is positioned below the rear portion of the motor case 22 and frontward of the lower portion of the board portion 6.

The reactor 109A is configured to reduce harmonic components contained in electrical current flowing to the brushless motor 3, and is disposed (accommodated) in the reactor accommodating portion 216. Here, the reason for providing the reactor 109A in the power supply circuit 9 will be described. As described above, the saber saw 101 employs the first capacitor 196A having a large capacitance. Therefore, if the reactor 109A were not provided in the power supply circuit 9, many harmonic components (harmonic noises) might be contained in the current flowing to the brushless motor 3 and thus adverse effects might be imparted on electrical devices disposed around the saber saw 101. On this point, in the second embodiment, harmonic components can be reduced since the reactor 109A is provided in the power supply circuit 9.

As described above, in the saber saw 101, a part of the first capacitor 196A is positioned inside the second connecting portion 212B (inside the connecting portion 212). That is, a part of the first capacitor 196A having a low priority for cooling is disposed inside the second connecting portion 212B through which the cooling air flow does not pass. Accordingly, cooling efficiency to the circuit elements (the switching elements Q1 through Q6 and the rectification circuit 92 (the diode 92A)) which have a high priority for cooling can be improved. Further, the reactor 109A that reduces the noise of harmonic components generated at the first capacitor 196A is disposed in the reactor accommodating portion 216 where the cooling air flow does not pass, thereby further improving cooling efficiency to the circuit elements having a high priority for cooling. Furthermore, the internal space of the second connecting portion 212B that is a dead space can be effectively utilized, thereby reducing the handle housing 21 in size.

Further, in the saber saw 101, the choke coil 91D is disposed in the first connecting portion 212A, and the part of the first capacitor 196A is disposed in the second connecting portion 212B. In this way, by efficiently utilizing the internal spaces of the first connecting portion 212A and second connecting portion 212B, the handle housing 21 can be made compact. Note that, in the saber saw 101, the same parts and components as those in the saber saw 1 exhibit the same functions and effects as those exhibited by the same parts and components in the saber saw 1.

Next, a saber saw 201 as an example of the power tool according to a third embodiment of the present invention will be described while referring to FIGS. 10 and 11, wherein like parts and components are designated by the same reference numerals as those shown in the saber saw 1 according to the first embodiment to avoid duplicating description, and only differences from the first embodiment will be described.

First, differences between the saber saw 201 and the saber saw 1 will be described. Layout of the board portion 6, positions of the inlet holes 2a, and cooling air flows in the saber saw 201 are different from those in the saber saw 1. Further, the rear wall portion 213C of the motor support portion 213 of the saber saw 201 is different from the rear wall portion 213C of the saber saw 1 in that the rear wall portion 213C of the saber saw 201 is formed with a plurality of inlet holes 213a. Furthermore, the power supply circuit 9 of the saber saw 201 is different from the power supply circuit 9 of the saber saw 1 in that the power supply circuit 9 of the saber saw 201 includes a third capacitor (not illustrated) instead of the first capacitor 96A. The saber saw 201 has the same structure as that of the saber saw 1 except the above-described differences.

Figure 10:
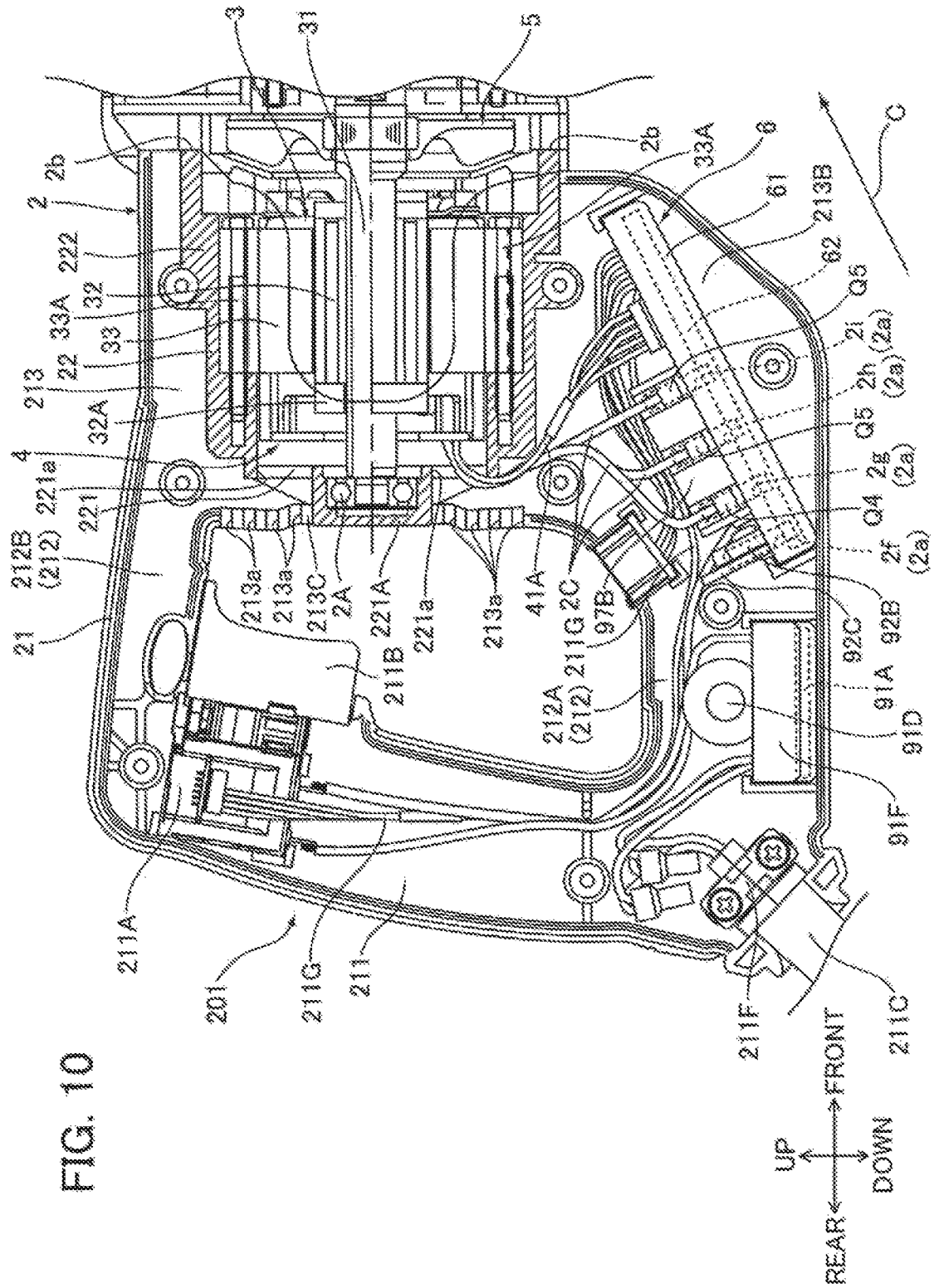
FIG. 10 is a partial enlarged cross-sectional view illustrating an internal structure of a handle housing and a motor case in a saber saw according to a third embodiment of the present invention.

As illustrated in FIG. 10, the board portion 6 of the saber saw 201 is disposed (accommodated) in the motor support portion 213 at a position below the motor case 22 and frontward of the choke coil 91. The board accommodating portion 61 extends in the direction C as indicated by an arrow in FIG. 10, and the opening of the board accommodating portion 61 faces in a direction perpendicular to the direction C. Further, the circuit board 62 is disposed in the board accommodating portion 61 so as to extend in the direction C. The direction C is a direction that is perpendicular to the leftward/rightward direction and directed diagonally upward and frontward. The direction C is an example of a "third direction" in the present invention.

In the saber saw 201, the front end of the board accommodating portion 61 is positioned frontward of the rear end of the motor case 22. The front portion of the board accommodating portion 61 overlaps with the motor case 22 in the axial direction of the rotation shaft 31 (that is, in the frontward/rearward direction). That is, the board accommodating portion 61 has a portion overlapping with the motor case 22 in the axial direction of the rotation shaft 31. With this structure, the board accommodating portion 61 can be disposed further frontward, enabling reduction of the size of the handle housing 21 in the frontward/rearward direction, that is, reduction of the size of the saber saw 201 in the frontward/rearward direction.

The third capacitor of the power supply circuit 9 in the saber saw 201 is a small-size capacitor whose capacitance is about 40 μF. The third capacitor is accommodated in the board accommodating portion 61 in a state where the third capacitor is mounted on the circuit board 62.

Each of the right side wall 213A and left side wall 213B of the motor support portion 213 in the saber saw 201 is formed with four inlet holes 2a. The four inlet holes 2a formed in the left side wall 213B will be only described since the handle housing 21 is bilaterally symmetric in shape.

The four inlet holes 2a formed in the left side wall 213B are arrayed in a direction C in the lower portion of the left side wall 213B. Each of the four inlet holes 2a has a rectangular shape elongated in a direction perpendicular to the direction C. In the following description, the four inlet holes 2a will be referred to as "inlet hole 2f", "inlet hole 2g", inlet hole "2f", and "inlet hole 2i" in the order from the upstream side toward the downstream side in the direction C. The inlet hole 2f has a portion overlapping with the rectification circuit unit 92B as viewed in the leftward/rightward direction. The inlet hole 2g has a portion overlapping with the switching element Q4 as viewed in the leftward/rightward direction. The inlet hole 2h has a portion overlapping with the switching element Q5 as viewed in the leftward/rightward direction. The inlet hole 2i has a portion overlapping with the switching element Q6 as viewed in the leftward/rightward direction. In other words, the rectification circuit unit 92B has a portion overlapping with the inlet hole 2f as viewed in the leftward/rightward direction. The switching element Q4 has a portion overlapping with the inlet hole 2g as viewed in the leftward/rightward direction. The switching element Q5 has a portion overlapping with the inlet hole 2h as viewed in the leftward/rightward direction. The switching element Q6 has a portion overlapping with the inlet hole 2i as viewed in the leftward/rightward direction. Each of the inlet holes 2g, 2h, and 2i is an example of "inlet hole" and also is an example of "second inlet hole" in the present invention. Each of the switching elements Q4 through Q6 is an example of "first switching element" and also is an example of "second switching element" in the present invention. The leftward/rightward direction is an example of "perpendicular direction" and also is an example of "direction perpendicular to the first direction".

Further, the rear wall portion 213C of the motor support portion 213 in the saber saw 201 is formed with the plurality of inlet holes 213a. The plurality of inlet holes 213a penetrates the rear wall portion 213C in the frontward/rearward direction and allows the interior of the motor support portion 213 to be communicated with the outside of the housing 2. Each of the inlet holes 213a extends in the leftward/rightward direction, and the inlet holes 213a are arrayed in the upward/downward direction.

Here cooling air flows in the saber saw 201 will be described with reference to FIG. 11. When the fan 5 of the saber saw 201 rotates, air is introduced into the motor support portion 213 through the eight inlet holes 2a, so that first cooling air flows flowing from the eight inlet holes 2a to the two exhaust holes 2b are generated in the housing 2 (as indicated by a plurality of broken line arrows in FIG. 11). Simultaneously, air is introduced into the motor support portion 213 also through the plurality of inlet holes 213a, so that second cooling air flows flowing from the plurality of inlet holes 213a to the two exhaust holes 2b are generated (as indicated by a plurality of solid line arrows in FIG. 11). Note that, the plurality of broken line arrows and the plurality of solid line arrows illustrated in FIG. 11 indicate typical ones among the first cooling air flows and second cooling air flows generated in the housing 2.

Figure 11:
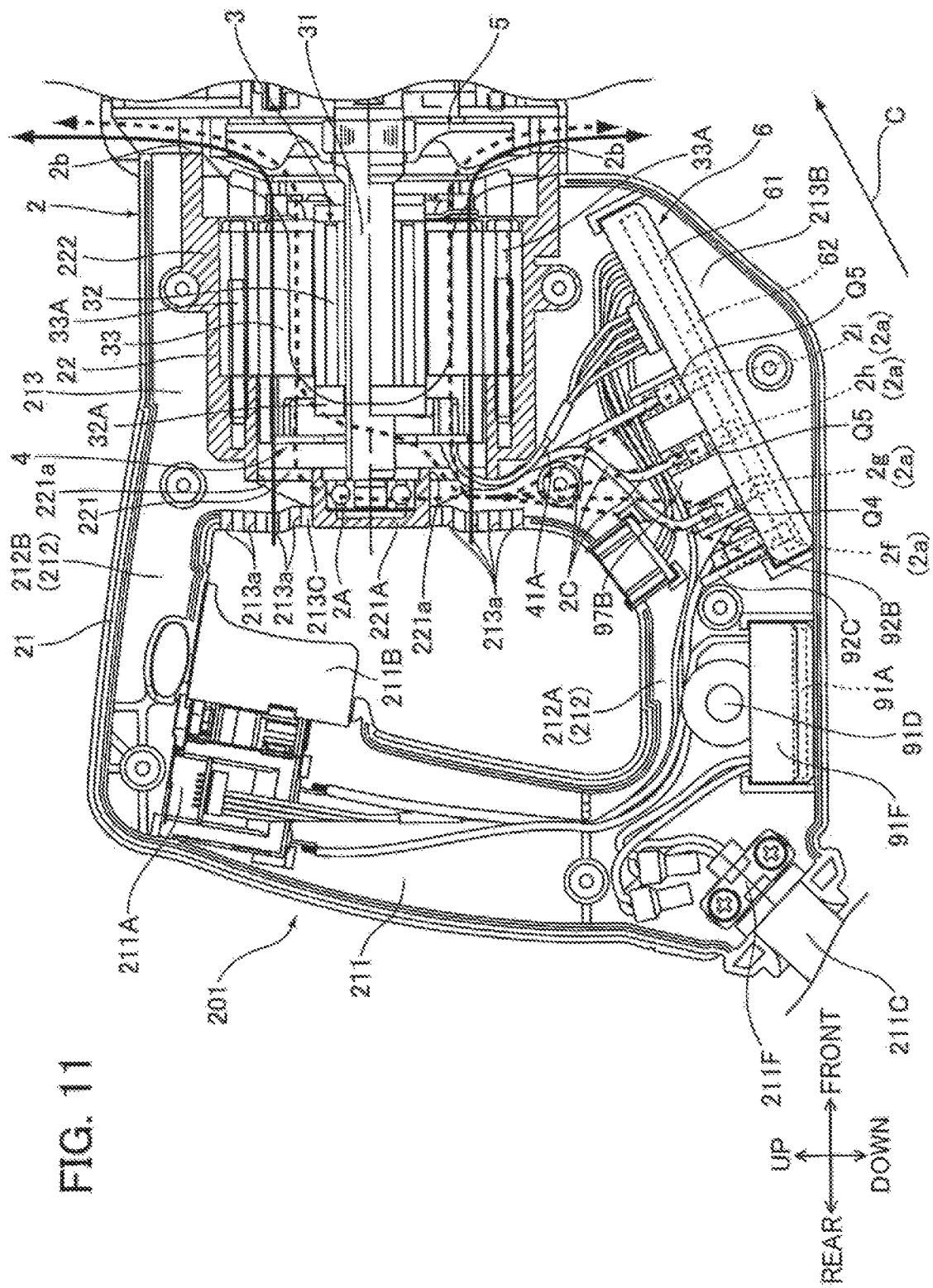
FIG. 11 is a view for description of first cooling air flows and second cooling air flows in the saber saw according to the third embodiment of the present invention.

As illustrated in FIG. 11, the first cooling air flows generated by the rotation of the fan 5 first cool the rectification circuit unit 92B (the rectification circuit 92) and the six switching elements Q1 through Q6, and then flow into the interior of the motor case 22 from the interior of the motor support portion 213 through the plurality of communication holes 221a.

On the other hand, the second cooling air flows generated by the rotation of the fan 5 flow into the interior of the motor case 22 from the interior of the motor support portion 213 through the plurality of communication holes 221a almost without cooling the switching elements Q1 through Q6 and rectification circuit unit 92B (the rectification circuit 92).

The first cooling air flows and the second cooling air flows merge together at positions adjacent to the communication hole 221a in the process of the introduction into the interior of the motor case 22. The merged cooling air flows cool the brushless motor 3 while passing through the interior of the stator 33 and the gap between the stator 33 and the inner peripheral surface of the motor case 22, and thereafter, are discharged outside the housing 2 through the two exhaust holes 2b.

In this way, the brushless motor 3 in the saber saw 201 is cooled by cooling air flows (mixed cooling air flows) in which the first cooling air flows that already cools the switching elements Q1 through Q6 and the second cooling air flows that does not substantially cool the switching elements Q1 through Q6 have been mixed with each other. The temperature of the mixed cooling air flows is lower than that of only the first cooling air flows. Therefore, the brushless motor 3 can be more effectively cooled in comparison with a structure where the brushless motor 3 is cooled by only the first cooling air flows.

Further, as described above, in the saber saw 201 according to the third embodiment of the present invention, the switching element Q4 has the portion overlapping with the inlet hole 2g as viewed in the leftward/rightward direction, the switching element Q5 has the portion overlapping with the inlet hole 2h as viewed in the leftward/rightward direction, and the switching element Q6 has the portion overlapping with the inlet hole 2i as viewed in the leftward/rightward direction. With this structure, the first cooling air flows that flow from the inlet hole 2g to the exhaust holes 2b cools the switching element Q4 in a state where the first cooling air flows have their lowest temperature, the first cooling air flows that flow from the inlet hole 2h to the exhaust holes 2b cools the switching element Q5 in a state where the first cooling air flows have their lowest temperature, and the first cooling air flows that flow from the inlet hole 2i to the exhaust holes 2b cools the switching element Q6 in a state where the first cooling air flows have their lowest temperature. Therefore, the switching elements Q4 through Q6 can be more effectively cooled. Note that, the same can be applied with respect to the switching elements Q1 through Q3. Further, in the saber saw 201, the same parts and components as those in the saber saw 1 exhibit the same functions and effects as those exhibited by the same parts and components in the saber saw 1.

Next, a saber saw 301 as an example of the power tool according to a fourth embodiment of the present invention will be described with reference to FIGS. 12 and 13, wherein like parts and components are designated by the same reference numerals as those shown in the saber saws 1 and 201 respectively according to the first and third embodiments to avoid duplicating description, and only differences from the first embodiment will be described.

First, differences between the saber saw 301 and the saber saw 1 will be described. The saber saw 301 is different from the saber saw 1 in that the saber saw 301 includes a control board accommodating portion 306A, a rectifier circuit accommodating portion 306B, and a switching board 306C, in place of the board portion 6 of the saber saw 1. The position of the sensor board 4 in the saber saw 301 is different from the position of the sensor board 4 in the saber saw 1. The fan 5 of the saber saw 301 is different from the fan 5 of the saber saw 1 in that the fan 5 of the saber saw 301 is provided with a magnet 305A. The positions and shapes of the plurality of inlet holes 2a, and the layout of the choke coil 91D and first capacitor 96A of the saber saw 301 are different from those in the saber saw 1. Further, the motor case 22 of the saber saw 301 is different from the motor case 22 of the saber saw 1 in that the motor case 22 of the saber saw 301 is formed with a communication hole 322a. Furthermore, the rear wall portion 213C of the saber saw 301 is different from the rear wall portion 213C of the saber saw 1 in that the rear wall portion 213C of the saber saw 301 is formed with the plurality of inlet holes 213a. The saber saw 301 has the same structure as that of the saber saw 1 except for the above-described differences. Note that, the plurality of inlet holes 213a formed in the rear wall portion 213C of the saber saw 301 are the same as those formed in the rear wall portion 213C of the saber saw 201, and therefore, further description thereto will be omitted.

Figure 12:
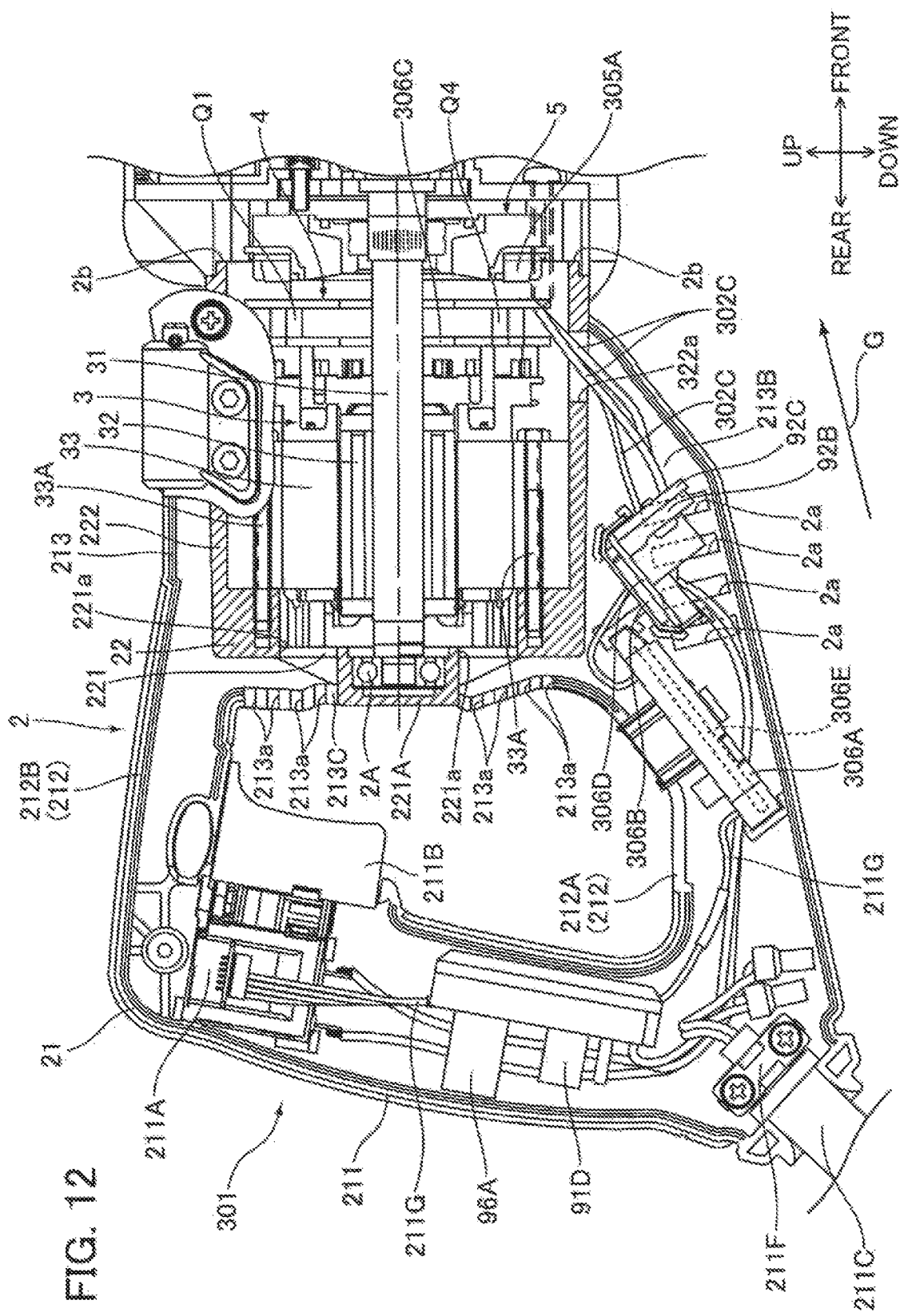
FIG. 12 is a partial enlarged cross-sectional view illustrating an internal structure of a handle housing and a motor case in a saber saw according to a fourth embodiment of the present invention.

As illustrated in FIG. 12, the control board accommodating portion 306A has a bottomed box shape opening diagonally upward and rearward. The control board accommodating portion 306A accommodates therein a control board 306E on which the controller 10 is mounted. Both the control board accommodating portion 306A and the control board 306E extend diagonally upward and frontward over the interior of the first connecting portion 212A and the interior of the motor support portion 213. That is, the rear portion of each of the control board accommodating portion 306A and the control board 306E is disposed (accommodated) in the first connecting portion 212A, while the front portion of each of the control board accommodating portion 306A and the control board 306E is disposed in the motor support portion 213.

The rectifier circuit accommodating portion 306B has a bottomed box shape opening in a direction opposite to the opening direction of the control board accommodating portion 306A. The rectifier circuit accommodating portion 306B accommodates therein a rectifier circuit board 306D on which the rectification circuit unit 92B (the rectification circuit 92) is mounted. The rectifier circuit accommodating portion 306B and the rectification circuit unit 92B are positioned below the rear portion of the motor case 22 in the motor support portion 213. The rectifier circuit board 306D is an example of a "board" in the present invention. The rectifier circuit accommodating portion 306B is an example of a "board case" in the present invention.

The switching board 306C has an annular shape in front view, and is provided frontward of the stator 33 of the brushless motor 3. The switching elements Q1 through Q6 (the switching elements Q2, Q3, Q5, and Q6 are not illustrated) are mounted on the front surface of the switching board 306C.

The sensor board 4 of the saber saw 301 is positioned frontward of the switching board 306C, and is supported by insulators extending frontward from the switching board 306C. The magnet 305A having an annular shape in front view is provided in the rear portion of the fan 5, and faces the three Hall elements 41 mounted on the front surface of the sensor board 4 in the frontward/rearward direction. The controller 10 in the fourth embodiment is configured to detect the rotational position of the rotor 22 by detecting the rotational position of the magnet 305A (the rotational position of the fan 5) on the basis of signals outputted from the three Hall elements 41.

The communication hole 322a is formed in the lower portion of the sleeve portion 222 of the motor case 22, and penetrates the sleeve portion 22 in the upward/downward direction, and extends in the frontward/rearward direction. A plurality of wirings 302C extending from the rectification circuit 92 and controller 10 extend to the interior of the motor case 22 through the communication hole 322a, and are connected to the circuit formed on the sensor board 4.

Each of the right side wall 213A and left side wall 213B of the motor support portion 213 of the saber saw 301 is formed with the four inlet holes 2a. The four inlet holes 2a formed in the left side wall 213B will be only described since the handle housing 21 is bilaterally symmetric in shape.

The four inlet holes 2a formed in the left side wall 213B are arrayed in a direction G in the lower portion of the left side wall 213B. Each of the four inlet holes 2a has a rectangular shape extending in a direction perpendicular to the direction G. In the present embodiment, the direction G is a direction that is perpendicular to the leftward/rightward direction and directed diagonally upward and frontward. Further, the inlet hole 2a positioned at the most downstream side in the direction G among the four inlet holes 2a has a portion overlapping with the rectification circuit unit 92B as viewed in the leftward/rightward direction. That is, the rectification circuit unit 92B (the rectification circuit 92) has a portion overlapping with the inlet hole 2a as viewed in the leftward/rightward direction.

The choke coil 91D and first capacitor 96A of the saber saw 301 are disposed (accommodated) in the grip portion 211, and are positioned below the switch mechanism portion 211A and above the base end portion 211F of the power source cord 211C. The choke coil 91D in the saber saw 301 is an example of a "filter element" in the present invention.

Here, cooling air flows in the saber saw 301 will be described with reference to FIG. 13. When the fan 5 of the saber saw 301 rotates, air is introduced into the motor support portion 213 through the eight inlet holes 2a. Hence, third cooling air flows flowing from the eight inlet holes 2a to the two exhaust holes 2b in the housing 2 (as indicated by a plurality of broken line arrows in FIG. 13) are generated. Simultaneously, air is introduced into the motor support portion 213 also through the plurality of inlet holes 213a, so that fourth cooling air flows flowing from the plurality of inlet holes 213a to the two exhaust holes 2b (as indicated by a plurality of solid line arrows in FIG. 13) are generated. Note that, the plurality of broken line arrows and the plurality of solid line arrows illustrated in FIG. 13 indicate typical ones among the third and fourth cooling air flows generated in the housing 2.

Figure 13:
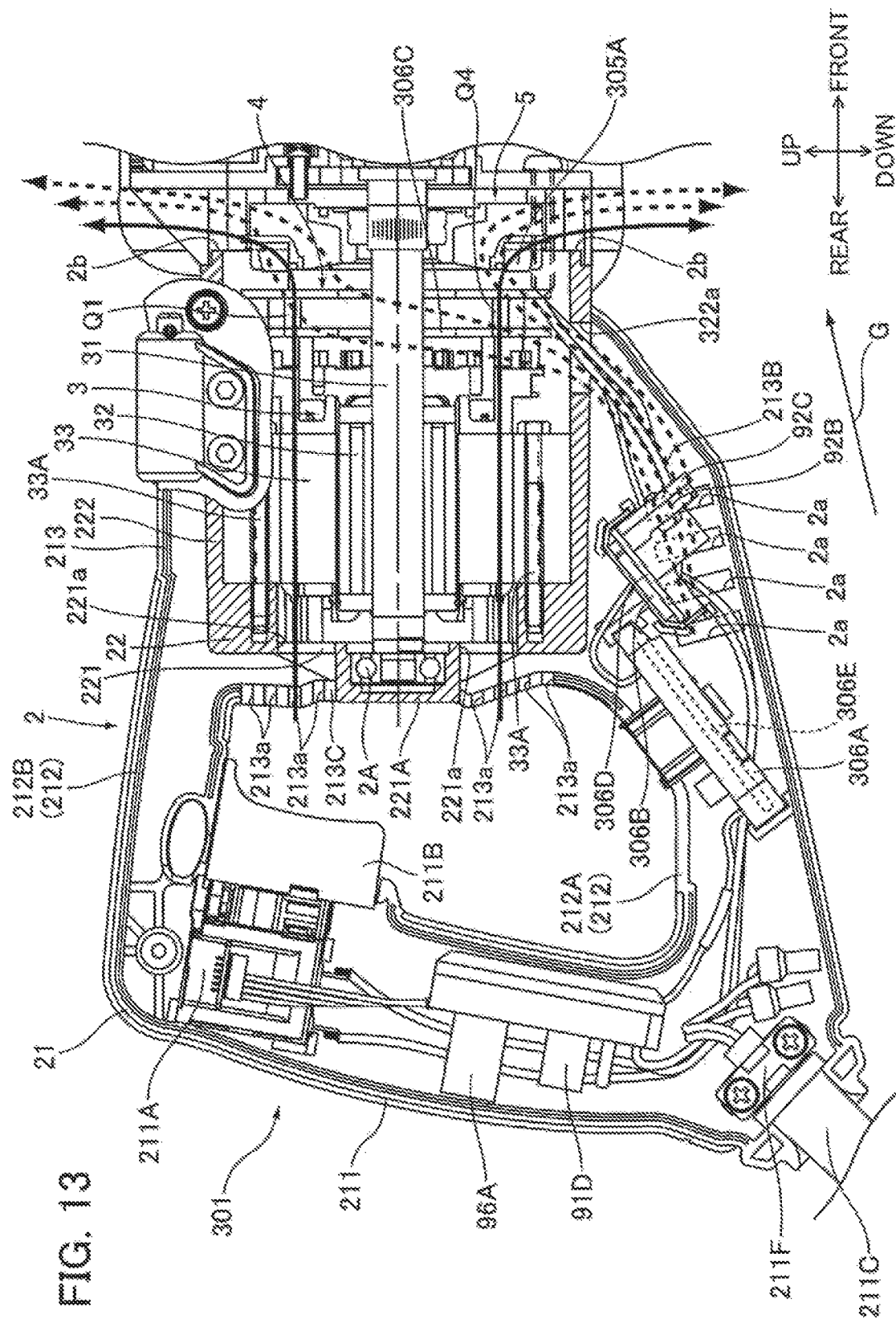
FIG. 13 is a view for description of third cooling air flows and fourth cooling air flows in the saber saw according to the fourth embodiment of the present invention.

As illustrated in FIG. 13, the third cooling air flows generated by the rotation of the fan 5 first cool the rectification circuit unit 92B (the rectification circuit 92) and then, flow into the motor case 22 through the communication hole 322a.

On the other hand, the fourth cooling air flows generated by the rotation of the fan 5 flows into the motor case 22 from the motor support portion 213 through the plurality of communication holes 221a almost without cooling the rectification circuit unit 92B. The fourth cooling air flows introduced into the motor case 22 first cool the brushless motor 3, and then reach the space defined between the stator 33 and the switching board 306C.

The third cooling air flows introduced into the motor case 22 and the fourth cooling air flows introduced into the space between the stator 33 and the switching board 306C merge at positions adjacent to the switching board 306C. The merged cooling air flows in which the third cooling air flows and the fourth cooling air flows are mixed cools the switching elements Q1 through Q6 mounted on the switching board 306C, and then, cools the sensor board 4 (the Hall elements 41), and thereafter, are discharged outside of the housing 2 through the two exhaust holes 2b.

In this way, the third cooling air flows and the fourth cooling air flows cool the circuit elements (the rectification circuit 92 (the diode 92A), the switching elements Q1 through Q6, and the sensor board 4 (the Hall elements 41)) and the brushless motor 3. Hence, a prolonged life and maintenance-free can be attained by employing the brushless motor 3, and the circuit elements generating heat due to supply of power to the brushless motor 3 can be suitably cooled.

Further, as described above, in the saber saw 301 according to the fourth embodiment, the control board 306E on which the controller 10 is mounted has a portion disposed inside the first connecting portion 212A. That is, the control board 306E on which the controller 10 given a low priority for cooling is mounted, is disposed in the first connecting portion 212A through which the cooling air flows (the third cooling air flows and the fourth cooling air flows) do not pass. As a result, enhanced cooling efficiency for the circuit elements (the switching elements Q1 through Q6, and the rectification circuit 92 (the diode 92A)) having a high priority for cooling can be obtained.

Further, in the saber saw 301, the choke coil 91D is disposed inside the grip portion 211. That is, the choke coil 91D having a low priority for cooling is disposed inside the grip portion 211 through which the cooling air flows do not pass. As a result, further enhanced cooling efficiency for the circuit elements (the switching elements Q1 through Q6 and the rectification circuit 92 (the diode 92A)) having a high priority for cooling can be attained.

Further, according to the saber saw 301, in the interior of the motor case 22 integrally molded in a bottomed hollow cylindrical shape, the switching board 306C and the sensor board 4 are disposed in the vicinity of the open end of the motor case 22 (at the front portion of the inner space of the motor case 22). Therefore, the layout of the switching board 306C and the sensor board 4 is not affected by the bolt 33A and screw bosses for fixing the brushless motor 3 to the motor case 22. Accordingly, a large-size board can be disposed. Note that, in the saber saw 301, the same parts and components as those in the saber saw 1 exhibit the same functions and effects as those exhibited by the same parts and components in the saber saw 1. Further, in the saber saw 301, the same parts and components as those in the saber saw 201 exhibit the same functions and effects as those exhibited by the same parts and components in the saber saw 201.

Next, a saber saw 401 as an example of the power tool according to a fifth embodiment of the present invention will be described while referring to FIGS. 14 through 17, wherein like parts and components are designated by the same reference numerals as those shown in the saber saw 1 according to the first embodiment to avoid duplicating description, and only differences from the first embodiment will be described.

First, main differences between the saber saw 401 and the saber saw 1 will be described. The saber saw 401 is different from the saber saw 1 in that the saber saw 401 includes six first inlet hole portions 424 instead of the six inlet holes 2a. The saber saw 401 is different from the saber saw 1 in that the saber saw 401 includes four second inlet hole portions 425 and four third inlet hole portions 426. The board accommodating portion 61 of the saber saw 401 is different in size from the board accommodating portion 61 of the saber saw 1. Further, the layout of the switching elements Q1 through Q6, the three radiation fins 97A, the radiation fin 97B, the rectification circuit unit 92B (the rectification circuit 92), the radiation fin 92C, and the first capacitor 96A in the saber saw 401 is different from that in the saber saw 1. Furthermore, the saber saw 401 is different from the saber saw 1 in that the signal wire 211G of the saber saw 401 is connected, through the second connecting portion 212B, to the controller 10 mounted on the circuit board 62.

Figure 14:
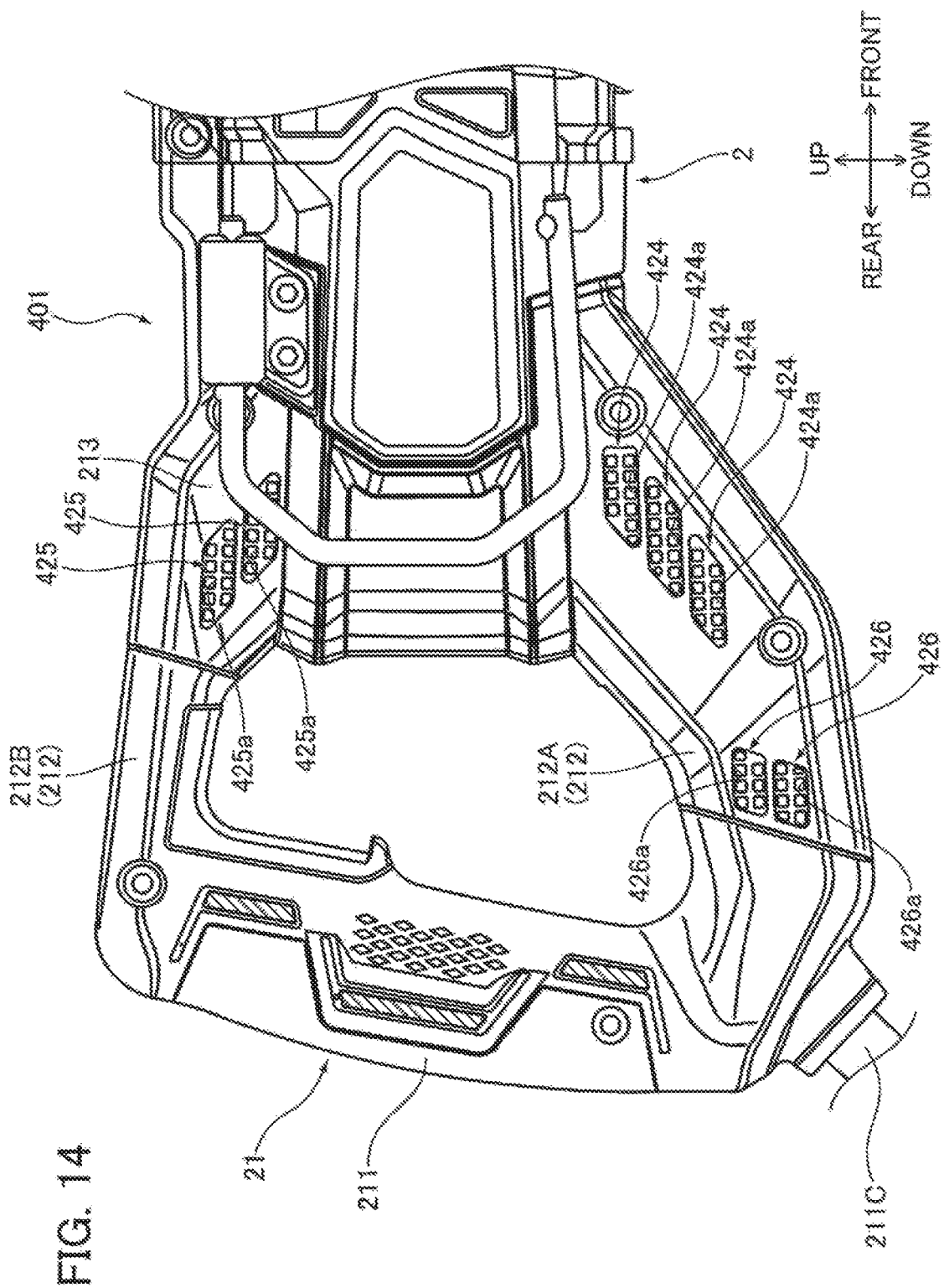
FIG. 14 is a side view illustrating an external appearance of a handle housing in a saber saw according to a fifth embodiment of the present invention.
Figure 15:
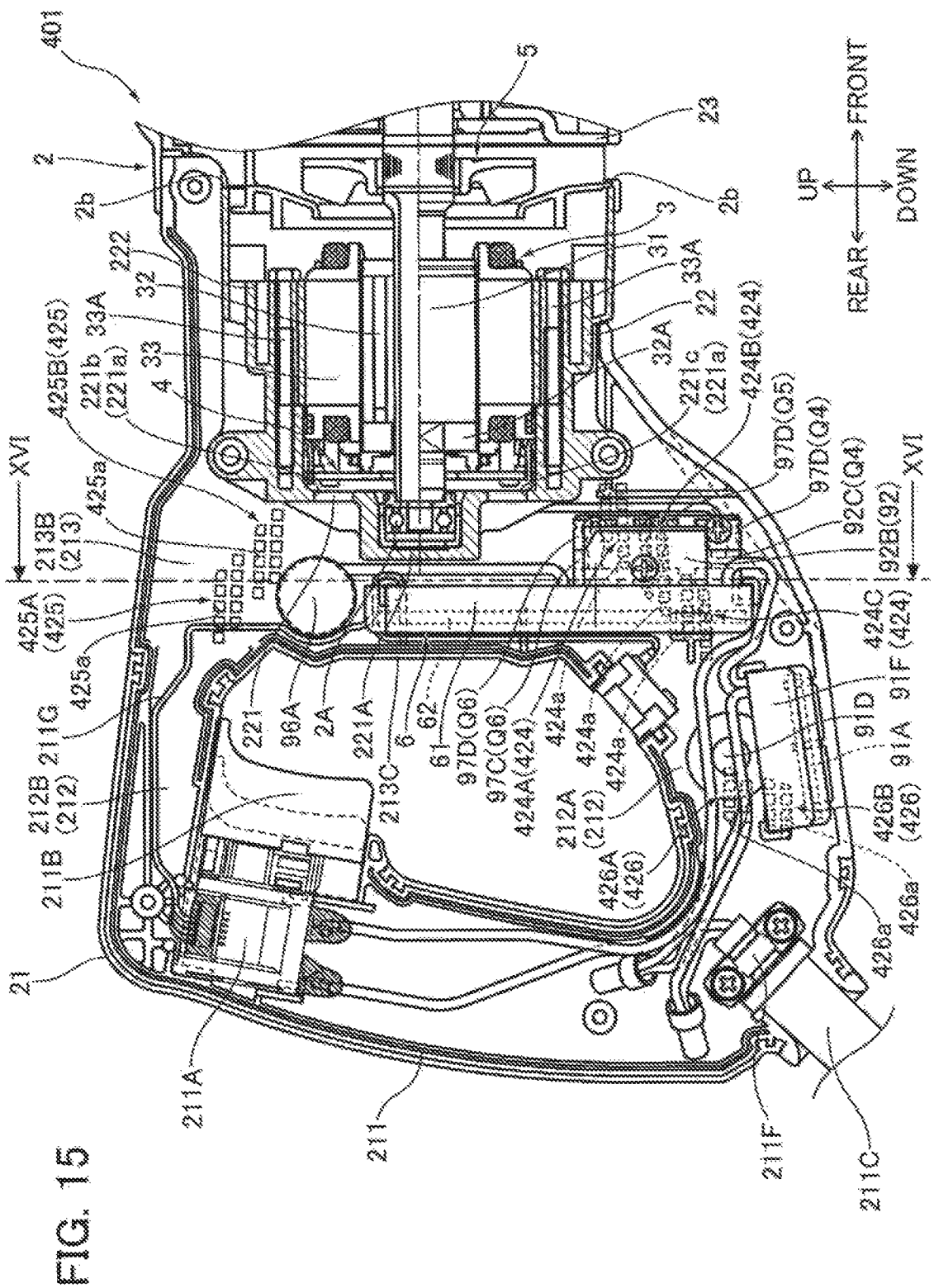
FIG. 15 is a view illustrating an internal structure of the handle housing and a motor case in the saber saw according to the fifth embodiment of the present invention.

As illustrated in FIGS. 14 and 15, the handle housing 21 of the saber saw 401 includes the above-described six first inlet hole portions 424, four second inlet hole portions 425, and four third inlet hole portions 426. Note that, in order to illustrate the internal structures of the handle housing 21 and motor case 22 of the saber saw 401, FIG. 15 illustrates a state prior to assembling the right divided housing half 21A to the left divided housing half 21B. Further, as for the motor case 22, the cross-section thereof is illustrated in FIG. 15.

The six first inlet hole portions 424 are provided at the motor support portion 213 of the handle housing 21. Each of the six first inlet hole portions 424 has a predetermined width in the upward/downward direction and extends in the frontward/rearward direction. Each of the six first inlet hole portions 424 is formed with a plurality of inlet holes 424a allowing the interior of the motor support portion 213 to be communicated with the outside of the housing 2. Three of the six first inlet hole portions 424 are positioned at the lower portion of the left side wall 213B of the motor support portion 213 and arrayed in the upward/downward direction, while the remaining three of the six first inlet hole portions 424 are positioned at the lower portion of the right side wall 213A of the motor support portion 213 and arrayed in the upward/downward direction. That is, of the six first inlet hole portions 424, three are provided at the left divided housing half 21B, while the remaining three are provided at the right divided housing half 21A.

The four second inlet hole portions 425 are provided at the motor support portion 213 of the handle housing 21. Each of the four second inlet hole portion 425 has a predetermined width in the upward/downward direction and extends in the frontward/rearward direction. Each of the four second inlet hole portion 425 is formed with a plurality of inlet holes 425a allowing the interior of the motor support portion 213 to be communicated with the outside of the housing 2. Two of the four second inlet hole portions 425 are positioned at the upper portion of the left side wall 213B of the motor support portion 213 and arrayed in the upward/downward direction, while the remaining two of the four second inlet hole portions 425 are positioned at the upper portion of the right side wall 213A of the motor support portion 213 and arrayed in the upward/downward direction. That is, of the four second inlet hole portions 425, two are provided at the left divided housing half 21B, while the remaining two are provided at the right housing half 21A.

The four third inlet hole portions 426 are provided at the first connecting portion 212A of the handle housing 21. Each of the four third inlet hole portions 426 has a predetermined width in the upward/downward direction and extends in the frontward/rearward direction. Each of the four third inlet hole portions 426 is formed with a plurality of inlet holes 426a allowing the interior of the first connecting portion 212A to be communicated with the outside of the housing 2. Two of the four third inlet hole portions 426 are positioned at the front portion of the left side wall of the first connecting portion 212A and arrayed in the upward/downward direction, while the remaining two of the four third inlet hole portions 426 are positioned at the front portion of the right side wall of the first connecting portion 212A and arrayed in the upward/downward direction. That is, of the four third inlet hole portions 426, two are provided at the left divided housing half 21B, while the remaining two are provided at the right divided housing half 21A.

The dimension in the upward/downward direction of the board accommodating portion 61 of the saber saw 401 is smaller than that of the board accommodating portion 61 of the saber saw 1. As illustrated in FIG. 15, the upper end of the board accommodating portion 61 of the saber saw 401 is positioned below the communication hole 221b.

Figure 16:
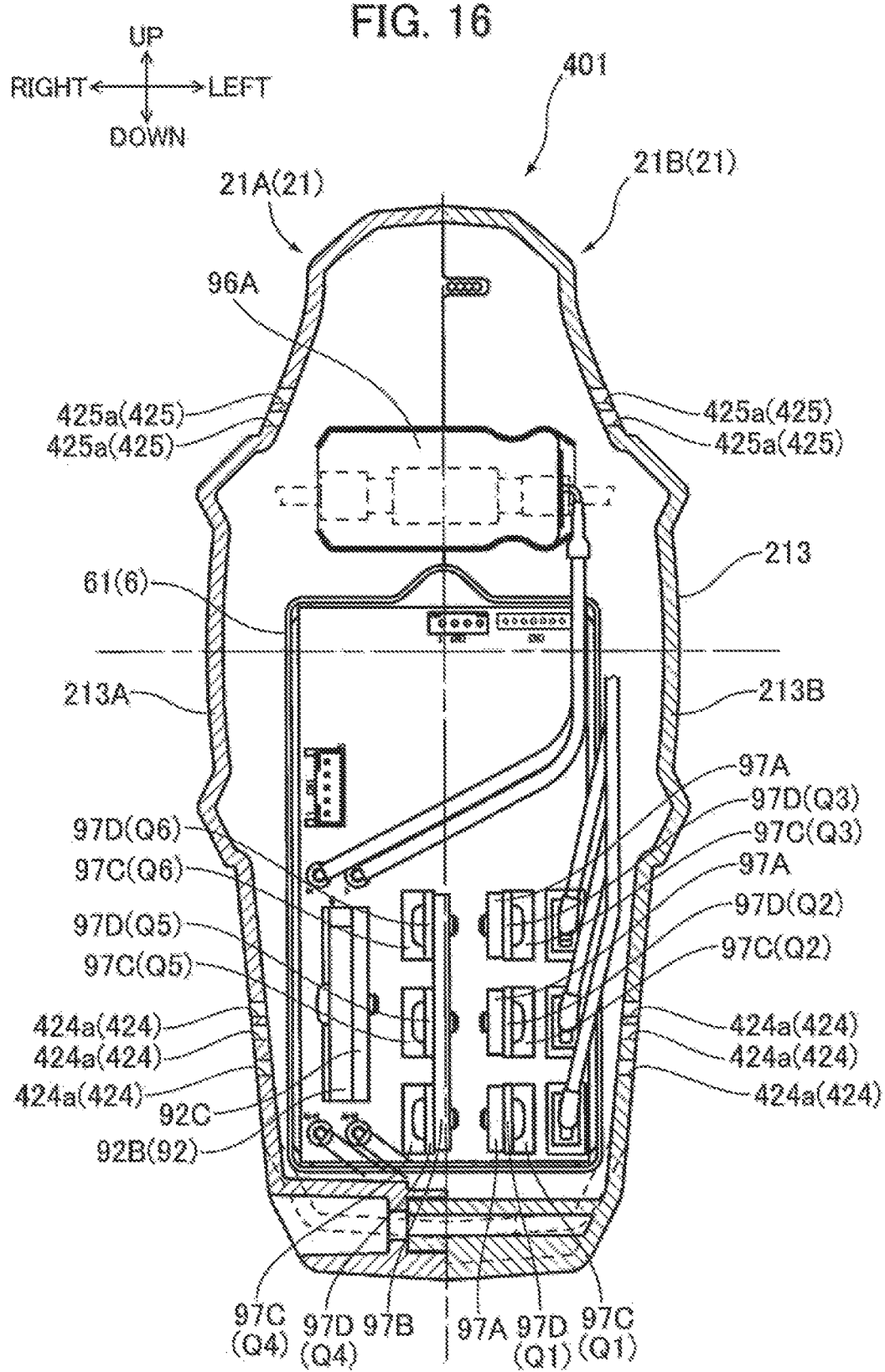
FIG. 16 is a front view illustrating a board accommodating portion in the saber saw according to the fifth embodiment of the present invention.

As illustrated in FIG. 16, in the saber saw 401, the switching elements Q1 through Q6, the three radiation fins 97A, the radiation fin 97B, the rectification circuit unit 92B (the rectification circuit 92), and the radiation fin 92C are mounted on the lower side portion of the circuit board 62 which is below the center in the upward/downward direction of the circuit board 62, and are disposed below the center in the upward/downward direction of the board accommodating portion 61. Note that, FIG. 16 is a front view of the board accommodating portion 61 of the saber saw 401, and also illustrates the cross-section of the handle housing 21 taken along the line XVI-XVI in FIG. 15. Further, the right rib portion 214 and the left rib portion 215 are omitted in FIG. 16 for simplicity.

The switching elements Q1 through Q3 of the saber saw 401 are disposed at the left lower portion of the front surface of the circuit board 62 and arrayed in the upward/downward direction. In each of the switching elements Q1 through Q3, the switching element body 97C is positioned outward (leftward in the present embodiment) of the heat sink 97D. Each of the three radiation fins 97A of the saber saw 401 is connected to the right surface of the heat sink 97D of the corresponding one of the switching elements Q1 through Q3. Further, in each of the switching elements Q1 through Q3, each of the switching element body 97C and heat sink 97D has a part overlapping with the bearing support portion 221A of the motor case 22 in the axial direction of the rotation shaft 31 (that is, in the frontward/rearward direction).

The switching elements Q4 through Q6 of the saber saw 401 are disposed at positions rightward of the switching elements Q1 through Q3 and arrayed in the upward/downward direction. In each of the switching elements Q4 through Q6, the switching element body 97C is positioned outward (rightward in the present embodiment) of the heat sink 97D. The radiation fin 97B of the saber saw 401 is connected to the left surfaces of the heat sinks 97D of the switching elements Q4 through Q6. Further, in each of the switching elements Q4 through Q6, each of the switching element body 97C and heat sink 97D has a part overlapping with the bearing support portion 221A in the axial direction of the rotation shaft 31.

The rectification circuit unit 92B (the rectification circuit 92) of the saber saw 401 is mounted on the lower portion of the front surface of the circuit board 62 at a position rightward of the switching elements Q4 through Q6 and radiation fin 97B and extends in the upward/downward direction. The radiation fin 92C of the saber saw 401 extends in the upward/downward direction, and is connected to the left surface of the rectification circuit unit 92B. Further, each of the rectification circuit unit 92B and radiation fin 97B has a part overlapping with the bearing support portion 221A in the axial direction of the rotation shaft 31.

The first capacitor 96A of the saber saw 401 is disposed above the board accommodating portion 61 in the motor support portion 213 in a posture in which the axial direction of the first capacitor 96A is substantially coincident with the leftward/rightward direction. Further, the first capacitor 96A has a part overlapping with the bearing support portion 221A of the motor case 22 in the axial direction of the rotation shaft 31. Note that, the saber saw 401 includes, instead of the capacitors 98B and 98D of the saber saw 1, two capacitors whose capacitances are lower than those of the capacitors 98B and 98D of the saber saw 1. The two capacitors of the saber saw 401 are mounted on the circuit board 62 with their entirety embedded in the urethane resin 61A, and therefore do not appear in FIGS. 15, 16 and 17.

As illustrated in FIG. 15, the signal wire 211G of the saber saw 401 extends from the switch mechanism portion 211A to the controller 10 mounted on the circuit board 62 of the board portion 6 through the interiors of the grip portion 211 and second connecting portion 212B.

Next, description will be made to the positional relationships of the three first inlet hole portions 424, the two second inlet hole portions 425, and the two third inlet hole portions 426 which are provided in the left divided housing half 21B relative to the various components provided in the handle housing 21. Note that, description will be omitted as to the positional relationships of the three first inlet hole portions 424, the two second inlet hole portions 425, and the two third inlet hole portions 426 which are provided in the right divided housing half 21A relative to the various components provided in the handle housing 21, since the handle housing 21 is bilaterally symmetrical in shape. In the following description, the three first inlet hole portions 424 provided at the left divided housing half 21B will be referred to as "first inlet hole portion 424A", "first inlet hole portion 424B", and "first inlet hole portion 424C" in the order from the top to the bottom. Moreover, of the two second inlet hole portions 425 provided at the left divided housing half 21B, the upper second inlet portion 425 will be referred to as "second inlet hole portion 425A", and the lower second inlet portion 425 will be referred to as "second inlet hole portion 425B". Furthermore, of the two third inlet hole portions 426 provided at the left divided housing half 21B, the upper third inlet portion 426 will be referred to as "third inlet hole portion 426A", and the lower third inlet portion 426 will be referred to as "third inlet hole portion 426B".

As illustrated in FIG. 15, the first inlet hole portion 424A has a part overlapping with the switching element Q3, the radiation fin 97A connected to the switching element Q3, the switching element Q6, the radiation fin 97B, the rectification circuit unit 92B, and the radiation fin 92C as viewed in the leftward/rightward direction. That is, some of the plurality of inlet holes 424a formed in the first inlet hole portion 424A overlap with the switching element Q3, the radiation fin 97A connected to the switching element Q3, the switching element Q6, the radiation fin 97B, the rectification circuit unit 92B, and the radiation fin 92C as viewed in the leftward/rightward direction.

The first inlet hole portion 424B has a part overlapping with the switching element Q2, the radiation fin 97A connected to the switching element Q2, the switching element Q5, the radiation fin 97B, the rectification circuit unit 92B, and the radiation fin 92C as viewed in the leftward/rightward direction. That is, some of the plurality of inlet holes 424a formed in the first inlet hole portion 424B overlap with the switching element Q2, the radiation fin 97A connected to the switching element Q2, the switching element Q5, the radiation fin 97B, the rectification circuit unit 92B, and the radiation fin 92C as viewed in the leftward/rightward direction.

The first inlet hole portion 424C has a part overlapping with the switching element Q1, the radiation fin 97A connected to the switching element Q1, the switching element Q4, the radiation fin 97B, the rectification circuit unit 92B, and the radiation fin 92C as viewed in the leftward/rightward direction. That is, some of the plurality of inlet holes 424a formed in the first inlet hole portion 424C overlap with the switching element Q1, the radiation fin 97A connected to the switching element Q4, the switching element Q4, the radiation fin 97B, the rectification circuit unit 92B, and the radiation fin 92C as viewed in the leftward/rightward direction.

Further, each of the first inlet hole portions 424A, 424B, and 424C has a part positioned frontward of the board accommodating portion 61 and rearward of the communication hole 221c (or the communication hole 221b) in the axial direction of the rotation shaft 31 (that is, in the frontward/rearward direction), That is, some of the plurality of inlet holes 424a formed in each of the first inlet hole portions 424A, 424B, and 424C are positioned frontward of the board accommodating portion 61 and rearward of the communication hole 221c (or the communication hole 221b) in the axial direction of the rotation shaft 31.

The second inlet portion 425A is positioned above the board accommodating portion 61 and the first capacitor 96A. In other words, the plurality of inlet holes 425a formed in the second inlet hole portions 425A are positioned above the board accommodating portion 61 and the first capacitor 96A.

The second inlet portion 425B is positioned above the board accommodating portion 61, and has a part overlapping with the first capacitor 96A in the upward/downward direction (a direction perpendicular to the axial direction of the rotation shaft 31). In other words, the plurality of inlet holes 425a formed in the second inlet portion 425B are positioned above the board accommodating portion 61, and a part of the plurality of inlet holes 425a formed in the second inlet portion 425B overlaps with the first capacitor 96A in the upward/downward direction.

Each of the second inlet hole portions 425A and 425B has a part positioned frontward of the board accommodating portion 61 and rearward of the communication hole 221c (or the communication hole 221b) in the axial direction of the rotation shaft 31 (that is, in the frontward/rearward direction). In other words, a part of the plurality of inlet holes 425a formed in each of the second inlet hole portions 425A and 425B is positioned frontward of the board accommodating portion 61 and rearward of the communication hole 221c (or the communication hole 221b) in the axial direction of the rotation shaft 31.

The third inlet portion 426A has a part overlapping with the choke coil 91D as viewed in the leftward/rightward direction. That is, a part of the plurality of inlet holes 426a formed in the third inlet portion 426A overlaps with the choke coil 91D as viewed in the leftward/rightward direction. The third inlet hole portion 426B is positioned below the board accommodating portion 61.

Next, cooling air flows in the saber saw 401 will be described with reference to FIG. 17. When the fan 5 of the saber saw 401 rotates, air is introduced into the motor support portion 213 through the pluralities of inlet holes 424a of the six first inlet hole portions 424 and the pluralities of inlet holes 425a of the four second inlet hole portions 425. Hence, fifth cooling air flows (as indicated by a plurality of broken line arrows W1 in FIG. 17) that flow from the pluralities of inlet holes 424a to the two exhaust holes 2b in the housing 2 are generated, and sixth cooling air flows (as indicated by a plurality of broken line arrows W2 in FIG. 17) that flow from the pluralities of inlet holes 425a to the two exhaust holes 2b in the housing 2 are also generated. Simultaneously, air is introduced into the first connecting portion 212A also through the pluralities of inlet holes 426a of the third inlet hole portions 426, so that seventh cooling air flows (as indicated by a plurality of broken line arrows W3 in FIG. 17) that flow from the pluralities of inlet holes 426a to the two exhaust hole 2b in the housing 2 is generated.

Figure 17:
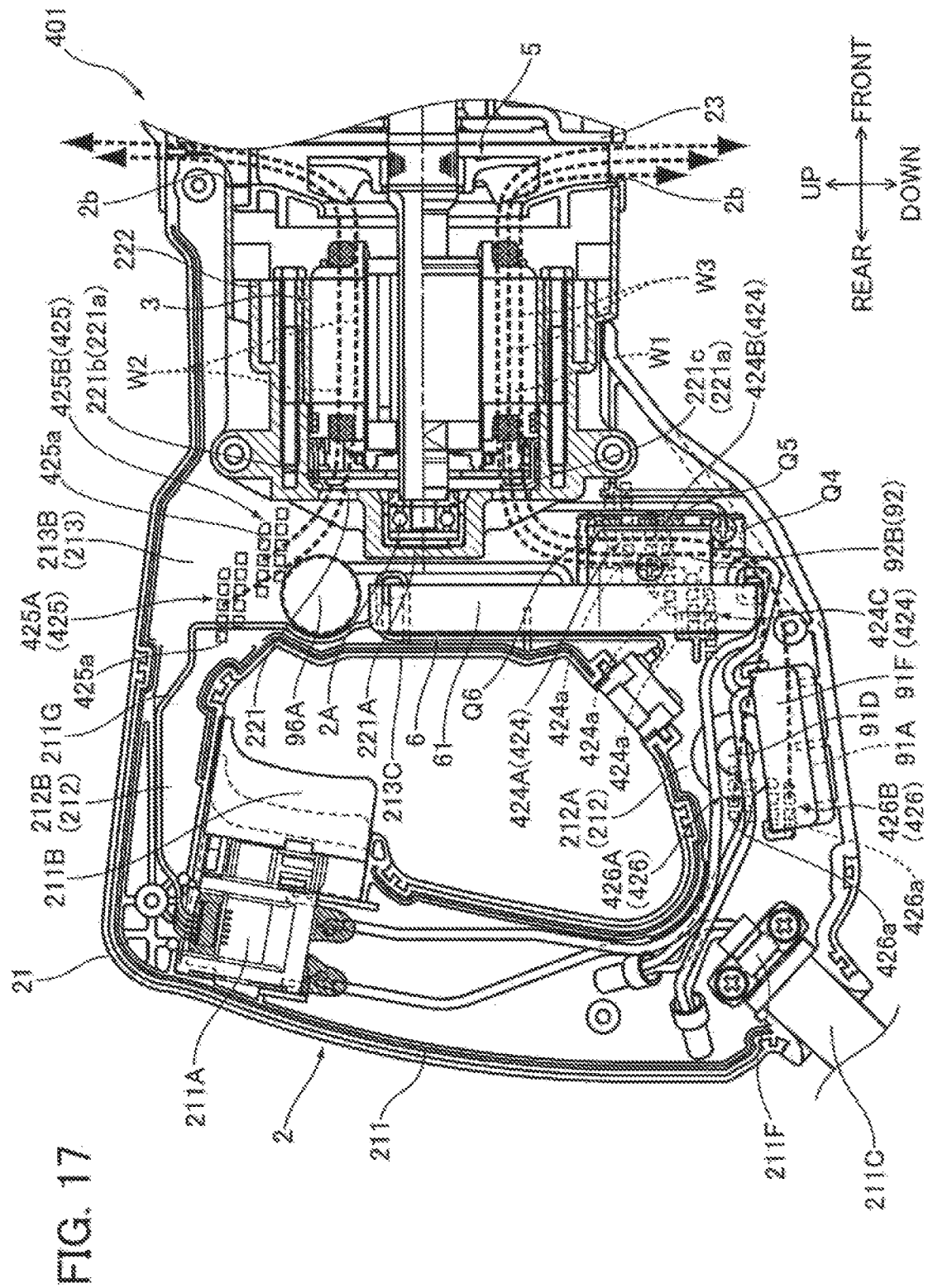
FIG. 17 is a view for description of fifth cooling air flows, sixth cooling air flows and seventh cooling air flows in the saber saw according to the fifth embodiment of the present invention.

As illustrated in FIG. 17, the fifth cooling air flows generated by the rotation of the fan 5 first cool the circuit elements and components which are mounted on the circuit board 62 accommodated in the board accommodating portion 61, that is, first cool the switching elements Q1 through Q6, the three radiation fins 97A, the radiation fin 97B, the rectification circuit unit 92B (the rectification circuit 92), and the radiation fin 92C, and then flow into the motor case 22 through the communication hole 221c. Thereafter, the fifth cooling air flows cool the brushless motor 3 and are discharged outside of the housing 2 through the two exhaust holes 2b.

The sixth cooling air flows first cool the first capacitor 96A, and then flow into the motor case 22 through the communication hole 221b. Thereafter, the sixth cooling air flows cool the brushless motor 3 and are then discharged outside of the housing 2 through the two exhaust holes 2b. That is, the sixth cooling air flows reach the brushless motor 3 without cooling the circuit elements and components (the switching elements Q1 through Q6, the three radiation fins 97A, the radiation fin 97B, the rectification circuit unit 92B (the rectification circuit 92), and the radiation fin 92C) which are mounted on the circuit board 62, and thereafter are discharged outside of the housing 2 through the two exhaust holes 2b.

The seventh cooling air flows first cool the various circuit elements and components which are mounted on the filter circuit board 91A accommodated in the filter circuit accommodating portion 91F, that is, first cool the choke coil 91D and the capacitor 91E and other components. Then, the seventh cooling air flows pass through the space defined below the board accommodating portion 61 and flow into the motor support portion 213. After the inflow into the motor support portion 213, the seventh cooling air flows cool the circuit elements and components (the switching elements Q1 through Q6, the three radiation fins 97A, the radiation fin 97B, the rectification circuit unit 92B, and the radiation fin 92C) which are mounted on the circuit board 62, and then flow into the motor case 22 through the communication hole 221c. Thereafter, the seventh cooling air flows cool the brushless motor 3, and are then discharged outside of the housing 2 through the two exhaust holes 2b.

In the saber saw 401 according to the fifth embodiment, the brushless motor 3 is cooled by the fifth cooling air flows, the sixth cooling air flows, and the seventh cooling air flows, thereby enabling to enhance cooling efficiency for the brushless motor 3. Further, as described above, after the sixth cooling air flows cool the first capacitor 96A whose amount of heat generation is not so large, the sixth cooling air flows cool the brushless motor 3 without cooling the circuit elements which are mounted on the circuit board 62 and whose amount of heat generation is large (i.e., without cooling the switching elements Q1 through Q6 and the rectification circuit unit 92B (the rectification circuit 92)). Hence, the sixth cooling air flows can cool the brushless motor 3 with their temperatures still low, even after cooling the first capacitor 96A. Consequently, cooling to the first capacitor 96A and enhancement of cooling efficiency to the brushless motor 3 can be attained.

Further, in the saber saw 401, the seventh cooling air flows cool the circuit elements and components which are mounted on the circuit board 62, after cooling the choke coil 91D and capacitor 91E whose amount of heat generation is not so large. Hence, even after cooling to the choke coil 91D and capacitor 91E is performed, the circuit elements (i.e., the switching elements Q1 through Q6, and the rectification circuit unit 92B (the rectification circuit 92)) whose amount of heat generation is large can be cooled with the fifth and seventh cooling air flows whose temperature is low. Accordingly, the present embodiment can achieve both enhancement of cooling efficiency to the circuit elements whose amount of heat generation is large, and cooling to the choke coil 91D and the capacitor 91E.

Further, in the saber saw 401, regarding the three first inlet hole portions 424, the two second inlet hole portions 425, and the two third inlet hole portions 426 which are formed in the left divided housing half 21B, the opening area of the three first inlet hole portions 424 is greater than that of the two second inlet hole portions 425, and the opening area of the two second inlet hole portions 425 is greater than that of the two third inlet hole portions 426. That is, amount of air introduced through the three first inlet hole portions 424 is greater than that introduced through the two second inlet hole portions 425, and the amount of air introduced through the two second inlet hole portions 425 is greater than that introduced through the two third inlet hole portions 426. With this structure, the amount of air introduced through the respective inlet hole portions is adjusted, whereby the parts and components which generate a large amount of heat can be cooled with priority.

Further, in the saber saw 401, the position of the center of the board accommodating portion 61 is positioned offset downwardly from the position of the center axis of the rotation shaft 31, similarly to the saber saw 1. With this structure, the upper end of the board accommodating portion 61 is positioned below both the second inlet portions 425 and the communication hole 221b. Hence, the sixth cooling air flows can smoothly flow into the motor case 22 without being blocked by the board accommodating portion 61. Further, in the saber saw 401, the length of the board accommodating portion 61 in the upward/downward direction can be made smaller than that of the board accommodating portion 61 of the saber saw 1 by altering the layout of the rectification circuit unit 92B. This structure can further properly suppress the sixth cooling air flows from being blocked by the board accommodating portion 61. Hence, further enhanced cooling efficiency to the brushless motor 3 can be achieved.

Further, in the saber saw 401, the position of the center of the board accommodating portion 61 is positioned offset from the position of the center axis of the rotation shaft 31. Specifically, the center of the board accommodating portion 61 is deviated below from the position of the center axis of the rotation shaft 31 (the position of the center of the bearing support portion 221A both in the upward/downward direction and leftward/rightward direction). This structure can facilitate the layout that the components protruding from the board accommodating portion 61 overlap with the motor case 22 in the axial direction of the rotation shaft 31. This structure is particularly advantageous for a structure in which most of the area of the mounting surface of the circuit board 62 is occupied by large-size circuit elements as in the present embodiment.

Further, in the saber saw 401, the circuit elements and components which are mounted on the circuit board 62, such as the switching elements Q1 through Q6, the three radiation fins 97A, the radiation fin 97B, the rectification circuit unit 92B (the rectification circuit 92), and the radiation fin 92C, are collectively disposed in the lower side portion of the board accommodating portion 61 which portion is below the center in the upward/downward direction of the board accommodating portion 61. Therefore, the fifth and seventh cooling air flows can securely hit on the circuit elements and components which are mounted on the circuit board 62, thereby further promoting cooling efficiency. Note that, in the saber saw 401, the same parts and components as those in the saber saw 1 exhibit the same functions and effects as those exhibited by the same parts and components in the saber saw 1.

While the description has been made in detail with reference to the specific embodiments of the present invention, the power tool according to the present invention is not limited to these embodiments, but various modifications may be made thereto without departing from the scope of the invention defined in the claims. Further, in the above-described embodiments, the saber saws including the motion converting portion 7 have been exemplified; however, the present invention is not limited to these saber saws, and is applicable to any power tool as long as the brushless motor is employed therein. The present invention is particularly advantageous to the power tool in which a large load is likely to be imparted on the brushless motor 3 (for example, a hammer drill and a jig saw which include a motion converting portion for converting rotation of a brushless motor into reciprocal motion). Further, the structure of the above-described embodiments may be partly omitted, or at least a part of the structure of one embodiment may be added to the structure of the other embodiments, or may be replaced by a part of the structure of the other embodiments.

Further, in the first and fourth embodiments, a part of the motor case 22 and a part of the circuit element are overlapped with each other in the frontward/rearward direction at a position below the bearing support portion 221A. However, the present invention is not limited to this. Alternatively, the part of the motor case 22 and the part of the circuit element may be overlapped with each other in the frontward/rearward direction at a position above the bearing support portion 221A. Also in the latter configuration, the handle housing 21 can be made compact.

Further, in the saber saw 101 according to the second embodiment, the choke coil 91D is disposed in the first connecting portion 212A, and a part of the first capacitor 196A is disposed in the second connecting portion 212B. However, the present invention is not limited to this. Alternatively, at least a part of the first capacitor 196A may be disposed in the first connecting portion 212A, and the choke coil 91D may be disposed in the second connecting portion 212B.

REFERENCE SIGNS LIST 1, 101, 201, 301, 401: saber saw, 2: housing, 2a; inlet hole, 2b: exhaust hole, 3: brushless motor, 5: fan, 8: reciprocal movement portion, 9: power supply circuit, 21: handle housing, 211: grip portion, P: external power source

The invention claimed is:

1. A power tool comprising:
a housing;
a brushless motor including a rotation shaft which extends in a front-rear direction;
a control circuit controlling the brushless motor; and
a circuit board on which at least part of the control circuit is mounted,
wherein the housing comprises:
a motor case having a motor accommodating portion which accommodates therein the brushless motor and has a hollow cylindrical shape; and
a first housing covering at least a part of the motor case and comprising a grip portion extending in a direction intersecting the front-rear direction,
the first housing is configured separately from the motor case and has an inner wall that covers at least a portion of the motor case in a radial direction of the brushless motor,
wherein at least a part of the circuit board is disposed inside a space provided between the motor case and the inner wall in the radial direction of the brushless motor.

2. The power tool according to claim 1, further comprising:
a reciprocal movement portion reciprocally movably supported by the housing; and
a motion converting portion configured to convert the rotation of the brushless motor into reciprocal motion of the reciprocal movement portion,
wherein the housing further comprises a second housing accommodating therein the motion converting portion,
wherein the reciprocal movement portion is supported by the second housing so as to be reciprocally movable along an axis extending in the front-rear direction,
wherein the first housing further comprises:
a motor support portion connected to the motor case; and
a connecting portion connecting the grip portion and the motor support portion,
wherein the grip portion is positioned at an opposite side of the motor support portion from the reciprocal movement portion in the front-rear direction,
wherein at least a part of the circuit board is disposed inside the motor support portion.

3. The power tool according to claim 2, further comprising:
a power supply cord extending from the housing and connectable to a power source, and
a power supply circuit;
wherein the power supply circuit further comprises a filter element for reducing noise transmitted from the power source to the power supply circuit, and
wherein the filter element is disposed inside one of the connecting portion and the grip portion.

4. The power tool according to claim 3, wherein the control circuit further comprises a capacitor for smoothening a voltage of the power source, and
wherein at least part of the capacitor is disposed inside the connecting portion.

5. The power tool according to claim 4, wherein the connecting portion comprises:
a first connecting portion connecting one end portion of the grip portion and the motor support portion; and
a second connecting portion connecting another end portion of the grip portion in the second direction and the motor support portion, and wherein the filter element is accommodated in one of the first connecting portion and the second connecting portion, and the at least part of the capacitor is accommodated in remaining one of the first connecting portion and the second connecting portion.

6. The power tool according to claim 2,
wherein at least part of the circuit board is positioned inside the connecting portion.

7. The power tool according to claim 1, further comprising:
a board case accommodating therein the circuit board,
wherein the first housing is formed by assembling two divided housing halves together in a direction crossing the front-rear direction,
wherein the board case is nipped and supported by the two divided housing halves.

8. The power tool according to claim 1,
wherein the first housing further comprises:
a motor support portion connected to the motor case; and
a connecting portion connecting the grip portion and the motor support portion,
wherein the circuit board is accommodated in the first housing so as a part of circuit board is disposed in the interior of the connection portion and another part of circuit board is disposed in the interior of the motor support portion.

9. The power tool according to claim 1,
wherein the first housing is formed by assembling two divided housing halves together in a left-right direction,
wherein a thickness direction of the circuit board is perpendicular to the left-right direction.

10. The power tool according to claim 9,
wherein the thickness direction of the circuit board is perpendicular to both the front-rear direction and an up-down direction.

11. The power tool according to claim 1,
wherein the control circuit is divided and mounted on a plurality of boards, and the circuit board is one of the plurality of boards.

12. The power tool according to claim 1, further comprising:
a fan driven by rotation of the brushless motor to generate a cooling air,
wherein the first housing has a ventilation hole through which the cooling air passes,
wherein the ventilation hole includes a first hole provided behind the brushless motor and a second hole provided below the brushless motor.

13. The power tool according to claim 1,
wherein at least a part of the circuit board is located below the motor case.

14. A power tool comprising:
a housing formed with an inlet hole and an exhaust hole;
a brushless motor having a rotor and a stator;
a power supply circuit comprising at least one circuit element for supplying electric power of a power source to the brushless motor;
a fan driven by rotation of the brushless motor to generate a cooling air flow flowing from the inlet hole to the exhaust hole in the housing;
a board on which the at least one circuit element is mounted; and
a board case formed in a container shape and accommodating therein the board,
wherein the housing comprises a first housing, the first housing comprising a grip portion and supporting the brushless motor,
wherein the inlet hole is formed in the first housing;
wherein the at least one circuit element is disposed inside the first housing and is cooled by the cooling air flow,
wherein the brushless motor comprises a rotation shaft portion extending in a front-rear direction,
wherein the housing further comprises a motor case having a hollow cylindrical shape,
wherein the first housing is formed by assembling two divided housing halves together in a left-right direction and having an accommodating portion which is disposed at below the motor case and accommodates at least a part of the board case,
wherein the board case is nipped and supported by the two divided housing halves,
wherein the brushless motor is supported by the motor case,
wherein the board case is positioned in the first housing so that the board case inclines with respect to the front-rear direction so that a front end of the board case is positioned above a rear end of the board case, and at least a part of the board case is positioned inside the accommodating portion, and the front end of the board case is positioned frontward of the front end of the stator.

15. A power tool comprising:
a housing;
an inlet hole provided in the housing for taking in an air outside the housing into the interior of the housing;
an exhaust hole provided in the housing for discharging the air inside the housing to the outside of the housing;
a brushless motor supported by the housing and having a rotating shaft extending along a first direction;
a switching element supplying power to the brushless motor;
a control circuit controlling the switching element;
a fan driven by rotation of the brushless motor to generate a cooling air flow flowing from the inlet hole to the exhaust hole in the housing;
a board case supporting the control circuit,
wherein the housing comprises a first housing, the first housing comprising a grip portion extending in a direction crossing the first direction and the first housing supporting the brushless motor,
wherein the inlet hole is formed in the first housing;
wherein the switching element is disposed inside the first housing and is cooled by the cooling air flow,
wherein the first housing is formed by assembling two divided housing halves together in a second direction crossing the first direction,
wherein the board case is nipped and supported by the two divided housing halves at a position between the grip portion of the first housing and the brushless motor in the first direction,
wherein at least part of the inlet hole is positioned between the board case and the brushless motor in the first direction.

16. The power tool according to claim 15, wherein the board case has a box shape opening toward the motor case, and
wherein a communication hole is formed in one end portion of the motor case in the first direction, the one end portion of the motor case in the first direction being closer to the grip portion than another end portion of the motor case in the first direction is to the grip portion.

17. The power tool according to claim 15, further comprising:
a board on which the switching element is mounted,
wherein the board case accommodating therein the board,
wherein the board case extends in a direction substantially perpendicular to the first direction, and
wherein a center of the board case is positioned offset from a center of the rotation shaft.

18. The power tool according to claim 15, wherein the switching element is cooled by the cooling air before cooling the motor.

19. The power tool according to claim 15, wherein the inlet hole is provided on a side portion of the first housing in the second direction.

20. The power tool according to claim 15,
wherein the control circuit is mounted on a circuit board,
wherein the circuit board is accommodated in the board case,
wherein the inlet hole is provided closer to the motor than a position where the first housing nips the board case.

* * * * *